(12) United States Patent
Takabayashi et al.

(10) Patent No.: US 7,545,528 B2
(45) Date of Patent: Jun. 9, 2009

(54) PRINT SYSTEM AND PRINT SYSTEM CONTROL METHOD

(75) Inventors: Nobuhisa Takabayashi, Nagano-ken (JP); Mikiya Shimada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 968 days.

(21) Appl. No.: 10/812,691

(22) Filed: Mar. 29, 2004

(65) Prior Publication Data
US 2004/0252337 A1 Dec. 16, 2004

(30) Foreign Application Priority Data

| Mar. 31, 2003 | (JP) | ............................. 2003-095487 |
| Apr. 2, 2003 | (JP) | ............................. 2003-099593 |
| Apr. 2, 2003 | (JP) | ............................. 2003-099594 |

(51) Int. Cl.
*G06F 15/00* (2006.01)
*G05B 11/01* (2006.01)

(52) U.S. Cl. ....................... 358/1.15; 700/19
(58) Field of Classification Search ................ 358/1.15, 358/1.14, 1.13, 1.1, 518; 400/61, 76; 235/380, 235/382; 101/483, 484; 710/19, 30; 700/235, 700/293, 297
See application file for complete search history.

(56) References Cited

U.S. PATENT DOCUMENTS

| 5,596,390 | A | 1/1997 | Sawada |
| 6,597,469 | B1 * | 7/2003 | Kuroyanagi ................ 358/1.15 |
| 7,177,034 | B2 | 2/2007 | Nakagawa et al. |

FOREIGN PATENT DOCUMENTS

| JP | 08-154161 | 6/1996 |
| JP | 10-329394 | 12/1998 |
| JP | 11-095937 | 4/1999 |
| JP | 2000-287079 | 10/2000 |
| JP | 2002-116899 | 4/2002 |
| JP | 2002-297334 | 10/2002 |
| JP | 2002-373117 | 12/2002 |

(Continued)

OTHER PUBLICATIONS

Abstract of Japanese Patent Publication No. 2003-044255, Pub. Date Feb. 14, 2003, Patent Abstracts of Japan.

(Continued)

*Primary Examiner*—Saeid Ebrahimi Dehkordy
(74) *Attorney, Agent, or Firm*—Martine Penilla & Gencarella, LLP

(57) ABSTRACT

In photo studio system 10, a count which represents a number of printing operations with regard to each of the printer 40 and 50 is reset to zero in response to successful establishment of connection of a print server 20 with the management server 70. The printer 40 and 50 are allowed to continuously carry out printing operations as long as the count is reset to zero before reaching the preset value. On the other hand, failed establishment of connection with the management server 70 causes the count to reach the preset value and imposes restrictions on the printing operations with regard to each of the printer 40 and 50. Each of the printers is not allowed to continue printing operations over a long time period in the state of disconnection from the management server. This arrangement desirably prevents the management server from suffering significant losses.

25 Claims, 20 Drawing Sheets

FOREIGN PATENT DOCUMENTS

JP          2003-044255          2/2003

OTHER PUBLICATIONS

Abstract of Japanese Patent Publication No. 2003-044255, Pub. Date: Feb. 14, 2003, Patent Abstracts of Japan.
Abstract of Japanese Patent Publication No. 08-154161, Pub. Date: Jun. 11, 1996, Patent Abstracts of Japan.
Abstract of Japanese Patent Publication No. 10-329394, Pub. Date: Dec. 15, 1998, Patent Abstracts of Japan.
Abstract of Japanese Patent Publication No. 11-095937, Pub. Date: Apr. 9, 1999, Patent Abstracts of Japan.
Abstract of Japanese Patent Publication No. 2000-287079, Pub. Date: Oct. 13, 2000, Patent Abstracts of Japan.
Abstract of Japanese Patent Publication No. 2002-116899, Pub. Date: Apr. 19, 2002, Patent Abstracts of Japan.
Abstract of Japanese Patent Publication No. 2002-297334, Pub. Date:Oct. 11, 2002, Patent Abstracts of Japan.
Abstract of Japanese Patent Publication No. 2002-373117, Pub. Date: Dec. 26, 2002, Patent Abstracts of Japan.

* cited by examiner

Fig. 2

| Job ID | Page No. | Number of Copies |
|---|---|---|
| 00102 | 1 | 3 |
| 00101 | 1 | 1 |
| | 2 | 1 |
| 00100 | 1 | 2 |
| | 2 | 2 |

| Job ID | Page No. | Number of Copies | Count | |
|---|---|---|---|---|
| | | | Start | End |
| 00102 | 1 | 3 | 243 | 240 |
| 00101 | 1 | 1 | 246 | 243 |
| | 2 | 1 | | |
| 00100 | 1 | 2 | 250 (Initial Setting) | 246 |
| | 2 | 2 | | |

9 → Total Number of Copies in Predetermined Time Interval 10 (=250−240) → Total Number of Printing Operations in Predetermined Time Period (b)

| Job ID | Page No. | Number of Copies | Count | |
|---|---|---|---|---|
| | | | Start | End |
| 00102 | 1 | 3 | 190 | 187 |
| 00101 | 1 | 1 | 220 | 218 |
| | 2 | 1 | | |
| 00100 | 1 | 2 | 250 (Initial Setting) | 246 |
| | 2 | 2 | | |

9 → Total Number of Copies in Predetermined Time Interval 63 (=250−187) → Total Number of Printing Operations in Predetermined Time Period

| Job ID | Page No. | Number of Copies | Count | |
|---|---|---|---|---|
| | | | Start | End |
| 00102 | 1 | 3 | 243 | 240 |
| 00101 | 1 | 1 | 246 | 243 |
| | 2 | 1 | | |
| 00100 | 1 | 2 | 250 (Initial Setting) | 246 |
| | 2 | 2 | | |

Count at Start of Current Print Job

Count at End of Previous Print Job (b)

| Job ID | Page No. | Number of Copies | Count | |
|---|---|---|---|---|
| | | | Start | End |
| 00102 | 1 | 3 | 190 | 187 |
| 00101 | 1 | 1 | 220 | 218 |
| | 2 | 1 | | |
| 00100 | 1 | 2 | 250 (Initial Setting) | 246 |
| | 2 | 2 | | |

Count at Start of Current Print Job

Count at End of Previous Print Job

Number of Printed Sheets with Regard to Current Print Job

| Job ID | Page No. | Number of Copies | Count | |
|---|---|---|---|---|
| | | | Start | End |
| 00102 | 1 | 3 | 243 | 240 |
| 00101 | 1 | 1 | 246 | 243 |
| | 2 | 1 | | |
| 00100 | 1 | 2 | 250 (Initial Setting) | 246 |
| | 2 | 2 | | |

3 (=243−240)

Number of Printing Operations Corresponding to Current Print Job (b)

Number of Printed Sheets with Regard to Current Print Job

| Job ID | Page No. | Number of Copies | Count | |
|---|---|---|---|---|
| | | | Start | End |
| 00102 | 1 | 3 | 190 | 157 |
| 00101 | 1 | 1 | 220 | 218 |
| | 2 | 1 | | |
| 00100 | 1 | 2 | 250 (Initial Setting) | 246 |
| | 2 | 2 | | |

33 (=190−157)

Number of Printing Operations Corresponding to Current Print Job

Fig. 19

| Job ID | Page No. | Number of Copies | Count | | Number of Printing Operations Corresponding to Each Print Job |
|---|---|---|---|---|---|
| | | | Start | End | |
| 00102 | 1 | 3 | 190 | 187 | 3 (=190−187) |
| 00101 | 1 | 1 | 220 | 218 | 2 (=220−218) |
| | 2 | 1 | | | |
| 00100 | 1 | 2 | 250 (Initial Setting) | 246 | 4 (=250−246) |
| | 2 | 2 | | | |

Count at Start of Each Print Job

Count at End of Its Previous Print Job

Fig. 20

| Job ID | Page No. | Number of Copies | Count | | Number of Printing Operations Corresponding to Each Print Job |
|---|---|---|---|---|---|
| | | | Start | End | |
| 00102 | 1 | 3 | 202 | 187 | 15 (=202−187) |
| 00101 | 1 | 1 | 230 | 212 | 18 (=230−212) |
| | 2 | 1 | | | |
| 00100 | 1 | 2 | 250 (Initial Setting) | 241 | 9 (=250−241) |
| | 2 | 2 | | | |

Count at Start of Each Print Job

Count at End of Its Previous Print Job

PRINT SYSTEM AND PRINT SYSTEM CONTROL METHOD

BACKGROUND OF THE INVENTION

1. Field of the Invention

The present invention relates to a print system that is capable of sending a status of a printer to a management server, which manages the status of the printer, via a telecommunication line, and a corresponding print system control method.

2. Description of the Prior Art

A known print system includes a print server that sends a status of each printer to a management server, which manages the status of the printer, via a network and receives print jobs from client computers, and two printers that are connected with the print server and receive allocation of print jobs by the print server (for example, Patent Laid-Open Gazette No. 2003-44255). This print system is located in each of multiple photo studios. The management server receives the statuses of printers from a print server of each print system located in each of the multiple photo studios and sets accounting to charge fees to the photo studio according to the received statuses of the printers.

Such a print system exerts the functions on the premise of transmission of the statuses of the printers from the print server to the management server. The management server sets accounting to charge fees to each photo studio according to the received statuses of the printers. In some circumstances, the printers in the print system located in a photo studio may be allowed to continue printing, while there is failed transmission of the statuses of the printers from the print system to the management server. In such cases, the management server can not set accounting to charge fees to the photo studio. The operator of the management server accordingly suffers significant losses. In some cases, the user (worker) of the photo studio may not notice the failed transmission of the statuses of the printers from the print system to the management server.

SUMMARY OF THE INVENTION

The object of the present invention is to provide a print system and a corresponding print system control method that prevent the management server from suffering significant losses in case of failed connection of the print system with the management server. The object of the present invention is further to provide a print system and a corresponding print system control method that effectively inform a user of the occurrence of some failure or trouble in the print system.

In order to achieve at least a part of aforementioned objects, the present invention is constructed as follows.

A print system of the present invention is a system that is capable of sending a status of a printer to a management server, which manages the status of the printer, via a telecommunication line, the print system including: a counting module that counts up printing operations of the printer to give a count representing a number of printing operations; a count judgment module that determines whether the count given by the counting module reaches a preset value; a printing operation restriction module that restricts printing operations of the printer when the count judgment module determines that the count reaches the preset value; a connection detection module that detects establishment of connection with the management server; and a count setting module that resets the count to a specified value prior to the preset value, in response to detection of establishment of connection with the management server by the connection detection module.

The print system of the invention counts up printing operations of the printer to give a count representing a number of printing operations, and restricts the printing operations of the printer when the count reaches a preset value. The count is reset to a specified value prior to the preset value, in response to detection of establishment of connection with the management server. Successful establishment of connection with the management server before the count representing the number of printing operations reaches the preset value enables the count to be reset to the specified value prior to the preset value. In such conditions, no restrictions are thus imposed on the printing operations of the printer. Failed establishment of connection with the management server, on the other hand, causes the count to reach the preset value and imposes restrictions on the printing operations of the printer. The printer is not allowed to continue printing operations over a long time period in the state of disconnection from the management server. This arrangement desirably prevents the management server from suffering significant losses. Restrictions on the printing operations of the printer effectively inform the user of the occurrence of some failure or trouble in the print system.

As one preferable embodiment of the invention, a print system further includes an error output module that outputs a print error, when the count judgment module determines that the count reaches the preset value, in place of or in addition to the printing operation restriction module.

In accordance with one preferable application of the print system of the invention, the count setting module resets the count to zero, in response to detection of establishment of connection with the management server by the connection detection module.

As another preferable embodiment of the invention, the print system further includes an auto connection trial module that tries to establish connection with the management server via the telecommunication line at every predetermined time interval after the start of the print system. In this preferable embodiment, the count judgment module may determine whether the count reaches the preset value, which is specified based on a maximum number of sheets printable with the printer in the predetermined time interval or based on a maximum number of sheets printable in response to a user's requirements in the predetermined time interval. In this preferable embodiment, the print system of the invention may further include a predetermined time interval variation module that varies the predetermined time interval according to a frequency of printing with the printer in response to a user's requirements.

In accordance with another preferable application of the print system of the invention, the connection detection module detects establishment of connection with the management server in the case of successful transmission of the status of the printer to the management server via the telecommunication line.

As another embodiment of the invention, the print system of the invention further includes a manual connection trial module that tries to establish connection with the management server via the telecommunication line, in response to a user's command output at an arbitrary timing.

In one preferable structure of the print system of the invention including a printer that carries out printing on a printing medium; and a print server that is capable of sending a status of the printer to a management server, which manages the status of the printer, via a telecommunication line, the printer includes: a counting module that counts up printing operations to give a count representing a number of printing operations; a count judgment module that determines whether the count given by the counting module reaches a preset value; and a printing operation restriction module that restricts printing operations when the count judgment module determines that the count reaches the preset value, and the print server includes: a connection detection module that detects establishment of connection with the management server; and a command output module that outputs a command to the printer to reset the count given by the counting module to a specified value prior to the preset value, in response to detection of establishment of connection with the management server by the connection detection module.

As still another preferable embodiment of the invention, the print system further includes: a printing instruction output module that outputs printing instructions in time series to the printer; an operation number input module that inputs a number of printing operations counted up by the counting module; and a verification module that compares a total number of printed sheets with regard to printing instructions output in a predetermined time interval to the printer by the printing instruction output module with a total number of printing operations input in the predetermined time interval by the operation number input module, and verifies a working status of the printer based on a result of the comparison. This arrangement requires some time for verification of the working status of the printer but readily detects the inappropriate working status of the printer. In this embodiment of the print system with the verification module, the verification module may determine whether either of a difference between the total number of printing operations input in the predetermined time interval by the operation number input module and the total number of printed sheets with regard to the printing instructions output in the predetermined time interval to the printer by the printing instruction output module and a ratio of the total number of printing operations to the total number of printed sheets is within a preset allowable range, so as to determine whether the working status of the printer is appropriate or inappropriate.

As still another embodiment of the invention, the print system further include: a printing instruction output module that outputs printing instructions in time series to the printer; a cumulative value input module that receives a cumulative count representing a number of printing operations at a start of execution of each printing instruction by the printer and a cumulative count representing a number of printing operations at an end of execution of the printing instruction by the printer, from the counting module; and a verification module that compares a cumulative count at an end of execution of a previous printing instruction received by the cumulative value input module with a cumulative count at a start of execution of a current printing instruction received by the cumulative value input module, among the printing instructions output in time series, and verifies a working status of the printer based on a result of the comparison. This arrangement requires output of at least two printing instructions in time series but readily detects the inappropriate working status of the printer. In this embodiment of the print system with the verification module, the verification module may determine whether either of a difference between the cumulative count at the start of execution of the current printing instruction and the cumulative count at the end of execution of the previous printing instruction among the printing instructions output in time series and a ratio of the cumulative count at the start of execution of the current printing instruction to the cumulative count at the end of execution of the previous printing instruction is within a preset allowable range, so as to determine whether the working status of the printer is appropriate or inappropriate.

As still another embodiment of the invention, the print system further includes: a printing instruction output module that outputs printing instructions in time series to the printer; a count input module that inputs a count representing a number of printing operations counted up in response to each of the printing instructions, from the counting module; and a verification module that compares a number of printed sheets with regard to each printing instruction with a count corresponding to the printing instruction, and verifies a working status of the printer based on a result of the comparison. This arrangement readily detects the inappropriate working status of the printer. In this embodiment of the print system with the verification module, the verification module may determine whether either of a difference between the count corresponding to each printing instruction and the number of printed sheets with regard to the printing instruction and a ratio of the count corresponding to each printing instruction to the number of printed sheets with regard to the printing instruction is within a preset allowable range, so as to determine whether the working status of the printer is appropriate or inappropriate.

In one preferable structure of the print systems with any one of the verification modules in the preferable embodiments described above, the print system including the management server that manages the status of the printer, and a print server that sends the status of the printer to the management server via the telecommunication line, the management server including at least the verification module and the print server including at least the printing instruction output module.

As still another embodiment of the invention, the print system further includes: a printing instruction output module that exclusively outputs printing instructions in time series to the printer; an operation number input module that inputs a number of printing operations counted up by the counting module; and an assumption module that compares a total number of printed sheets with regard to printing instructions output in a predetermined time interval to the printer by the printing instruction output module with a total number of printing operations input in the predetermined time interval by the operation number input module, compares a number of printed sheets with regard to each of the printing instructions output to the printer by the printing instruction output module with a number of printing operations counted up in response to the each printing instruction and input by the operation number input module, and assumes a working status of the printer based on results of the comparisons. In this arrangement, the result of the former comparison suggests a potential for execution of any printing operation other than those following printing instructions output from the printing instruction output module. The result of the latter comparison determines whether each printing operation follows a printing instruction, so as to assume the occurrence of any trouble or failure in the printer. Execution of a printing operation other than those following the printing instructions output from the printing instruction output module may be ascribed to some failure or trouble arising in the printer. The result of the latter comparison is thus used to distinctly determine whether each printing operation follows a printing instruction and thereby assume the occurrence of any trouble or failure in the printer. In this embodiment of the print system with the assumption module, while the result of the comparison between the total number of printing operations input in the predetermined time interval and the total number of printed sheets with regard to the printing instructions output in the predetermined time interval to the printer is out of a preset allowable range, the assumption module may assume that the printer carries out printing in response to a foreign printing instruction received from a foreign device other than the printing instruction output module, when the result of the comparison between the number of printing operations counted up in response to each printing instruction and the number of printed sheets with regard to the each printing instruction is within a predetermined allowable range. On the other hand, the assumption module may assume that the printer has some abnormality, when the result of the comparison between the number of printing operations counted up in response to each printing instruction and the number of printed sheets with regard to the each printing instruction is also out of a predetermined allowable range.

As still another preferable embodiment of the invention, the print system further include: a printing instruction output module that exclusively outputs printing instructions in time series to the printer; a cumulative value input module that receives a cumulative count representing a number of printing operations at a start of execution of each printing instruction by the printer and a cumulative count representing a number of printing operations at an end of execution of the printing instruction by the printer, from the counting module; a printing operation number computation module that computes a number of printing operations corresponding to each printing instruction from the two cumulative counts received by the cumulative value input module; and an assumption module that compares a cumulative count at an end of execution of a previous printing instruction received by the cumulative value input module with a cumulative count at a start of execution of a current printing instruction received by the cumulative value input module, among the printing instructions output in time series by the printing instruction output module, compares a number of printed sheets with regard to each of the printing instructions output to the printer by the printing instruction output module and a number of printing operations corresponding to the each printing instruction computed by the printing operation number computation module, and assumes a working status of the printer based on results of the comparisons. In this arrangement, the result of the former comparison suggests a potential for execution of any printing operation other than those following printing instructions output from the printing instruction output module. The result of the latter comparison determines whether each printing operation follows a printing instruction, so as to assume the occurrence of any trouble or failure in the printer. Execution of a printing operation other than those following the printing instructions output from the printing instruction output module may be ascribed to some failure or trouble arising in the printer. The result of the latter comparison is thus used to distinctly determine whether each printing operation follows a printing instruction and thereby assume the occurrence of any trouble or failure in the printer. In this embodiment of the print system with the assumption module, while a difference between the cumulative count at the start of execution of the current printing instruction and the cumulative count at the end of execution of the previous printing instruction, among the printing instructions output in time series, is out of a preset allowable range, the assumption module may assume that the printer carries out printing in response to a foreign printing instruction received from a foreign device other than the printing instruction output module, when but the result of the comparison between the computed number of printing operations corresponding to each printing instruction and the number of printed sheets with regard to the each printing instruction is within a predetermined allowable range. On the other hand, the assumption module may assume that the printer has some abnormality, when the result of the comparison between the number of printing operations corresponding to each printing instruction and the computed number of printed sheets with regard to the each printing instruction is also out of a predetermined allowable range.

In one preferable structure of the print systems with any one of the assumption modules in the preferable embodiments described above, the print system include a management server that manages the status of the printer, and a print server that sends the status of the printer to the management server via the telecommunication line, where the management server may include at least the assumption module and the print server may include at least the printing instruction output module.

A print system control method of the present invention is a method of activating one or multiple computers to control a print system that is capable of sending a status of a printer to a management server, which manages the status of the printer, via a telecommunication line, the print system control method including the steps of: counting up printing operations of the printer to give a count representing a number of printing operations; judging whether the count given in the count-up step reaches a preset value; restricting printing operations of the printer when the judgment step determines that the count reaches the preset value; detecting establishment of connection with the management server; and resetting the count to a specified value prior to the preset value, in response to detection of establishment of connection with the management server in the detection step.

In this print system control method, the printer is not allowed to continue printing operations over a long time period in the state of disconnection from the management server. The arrangement desirably prevents the management server from suffering significant losses. Restrictions on the printing operations of the printer effectively inform the user of the occurrence of some failure or trouble in the print system.

In accordance with one preferable application, the print system control method of the invention further includes the steps of: outputting printing instructions in time series to the printer; and comparing a total number of printed sheets with regard to printing instructions output in a predetermined time interval to the printer in the printing-instruction-output step with a total number of printing operations given in the count-up step in the predetermined time interval, and verifying a working status of the printer based on a result of the comparison.

In accordance with another preferable application, the print system control method further includes the steps of: outputting printing instructions in time series to the printer; receiving a cumulative count representing a number of printing operations at a start of execution of each printing instruction by the printer and a cumulative count representing a number of printing operations at an end of execution of the printing instruction by the printer; and comparing a cumulative count at an end of execution of a previous printing instruction with a cumulative count at a start of execution of a current printing instruction, among the printing instructions output in time series, and verifying a working status of the printer based on a result of the comparison.

In accordance with another preferable application, the print system control method of the invention further includes the steps of: outputting printing instructions in time series to the printer; inputting a count representing a number of printing operations given in the count-up step, in response to each of the printing instructions; and comparing a number of printed sheets with regard to each printing instruction with a count corresponding to the printing instruction, and verifying a working status of the printer based on a result of the comparison.

In accordance with still another preferable application, the print system control method of the invention further includes the steps of: outputting printing instructions in time series to the printer; and comparing a total number of printed sheets with regard to printing instructions output in a predetermined time interval to the printer in the printing-instruction-output step with a total number of printing operations given in the count-up step in the predetermined time interval, comparing a number of printed sheets with regard to each of the printing instructions output to the printer in the printing-instruction-output step with a number of printing operations counted up in response to the each printing instruction and input in the count-up step, and assuming a working status of the printer based on results of the comparisons.

In accordance with still another preferable application, the print system control method of the invention further includes ng the steps of: outputting printing instructions in time series to the printer; receiving a cumulative count representing a number of printing operations at a start of execution of each printing instruction by the printer and a cumulative count representing a number of printing operations at an end of execution of the printing instruction by the printer; computing a number of printing operations corresponding to each printing instruction from the two cumulative counts received in the cumulative-count-input step; and comparing a cumulative count at an end of execution of a previous printing instruction received in the cumulative-count-input step with a cumulative count at a start of execution of a current printing instruction received in the cumulative-count-input step, among the printing instructions output in time series in the printing-instruction-output step, comparing a number of printed sheets with regard to each of the printing instructions output to the printer in the printing-instruction-output step and a number of printing operations corresponding to the each printing instruction computed in the computation step, and verifying a working status of the printer based on results of the comparisons.

The technique of the present invention is also applicable to a computer program that causes one or multiple computers to execute respective steps of the print system control method discussed above. Such program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. In the server computer of the invention, only a single computer may execute all the procedures or multiple computers may share execution of the procedures.

BRIEF DESCRIPTION OF THE DRAWINGS

FIG. 2 shows an example of contents included in a print job;

FIG. 8 shows working statuses of a printer, more specifically

FIG. 8(a) shows an appropriate working status of the printer and

FIG. 8(b) shows an inappropriate working status of the printer;

FIG. 10 shows working statuses of a printer in the modified structure, more specifically FIG. 10(a) shows an appropriate working status of the printer and FIG. 10(b) shows an inappropriate working status of the printer;

FIG. 12 shows working statuses of a printer in the modified structure, more specifically FIG. 12(a) shows an appropriate working status of the printer and FIG. 12(b) shows an inappropriate working status of the printer;

FIG. 19 shows one example of an unauthorized use state of the printer in the modified structure of the second embodiment; and FIG. 20 shows one example of an abnormal state of the printer in the modified structure of the second embodiment.

DESCRIPTION OF THE PREFERRED EMBODIMENTS

First Embodiment

Figure 1:
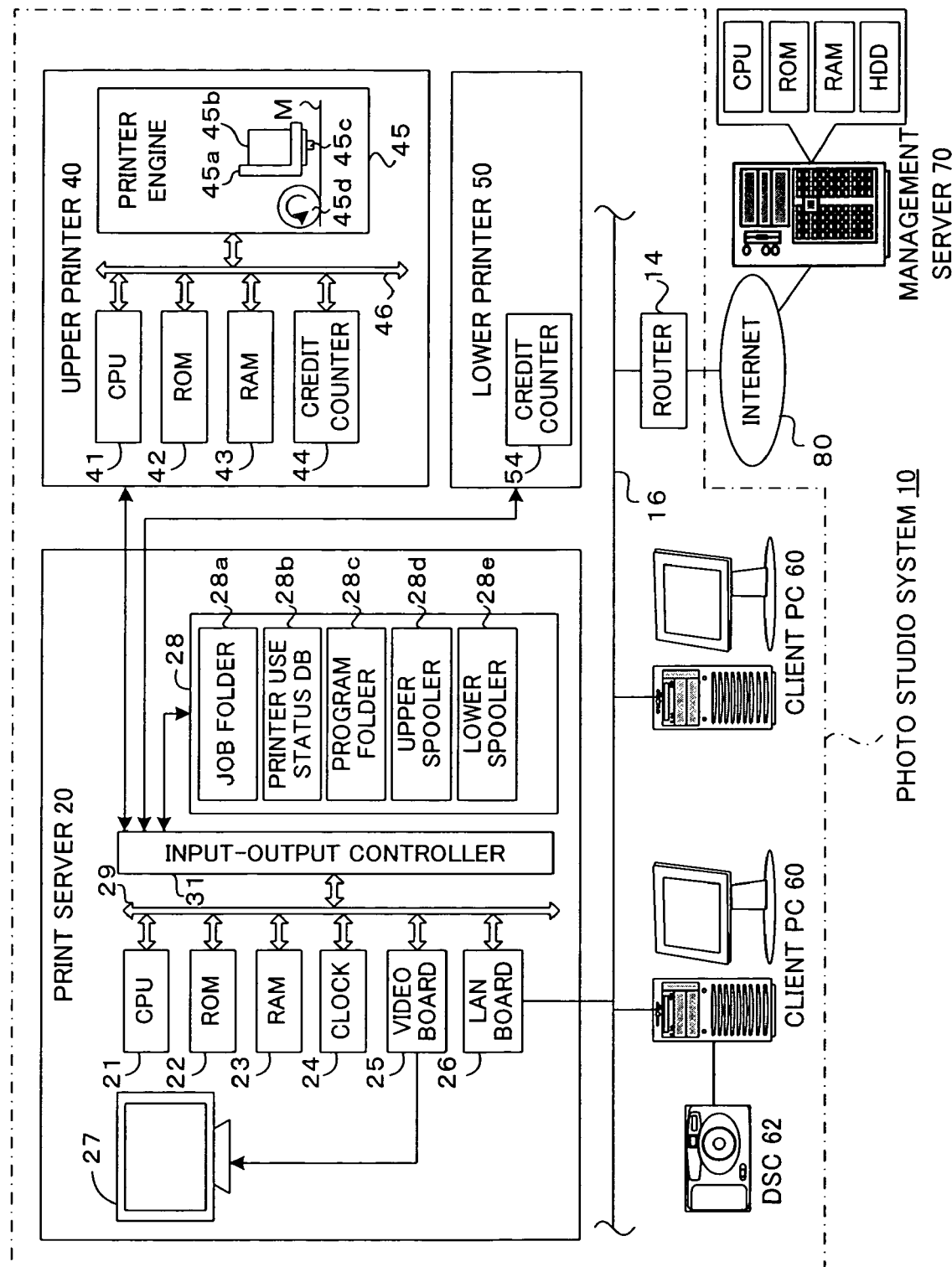
FIG. 1 schematically illustrates the configuration of a photo studio system in a first embodiment.

FIG. 1 schematically illustrates the configuration of a photo studio system 10 in a first embodiment of the invention. As illustrated in FIG. 1, the photo studio system 10 of the first embodiment includes a print server 20 that communicates with a management server 70 via the Internet 80 as a telecommunication line, multiple client PCs 60 that output print jobs to the print server 20, and two printers 40 and 50 that receive print jobs allocated by the print server 20. The two printers 40 and 50 and the print server 20 are placed in an identical casing. In the casing, the printer 40 is located on an upper step and the printer 50 is located on a lower step. In the description below, the printers 40 and 50 may thus be referred to as the upper printer 40 and the lower printer 50. The symbol 'PC' represents a personal computer.

The print server 20 has a CPU 21 that executes diverse operations and computations, a ROM 22 that stores a group of programs executed to, for example, specify the hardware settings, a RAM 23 that temporarily stores data in the course of diverse operations and computations executed by the CPU 21, a clock generator 24 that generates an operation clock, a video board 25 that has a display connector for connection with a display 27, a LAN board 26 that is connected with a LAN cable 16 for establishment of a LAN, and an input-output controller 31 for connection and control of various devices and units. These components are mutually connected via a bus 29. The print server 20 is connected with a hard disk 28 via the input-output controller 31, while being connected with the two printers 40 and 50 via respective USB terminals. The print server 20 is also connected with the multiple client PCs 60 and a router 14 via the LAN cable 16, and is linked with the management server 70 through the Internet 80 via the router 14.

The hard disk 28 of the print server 20 has a job folder 28a that stores various data included in each printing instruction sent from each of the client PCs 60 as a print job, a printer use record database 28b that stores status records of the two printers 40 and 50 and a record of print jobs in the form of a database of printer use records, a program folder 28c that stores diverse programs, an upper spooler 28d that spools and holds an active print job currently executed and a next print job to be printed next with regard to the upper printer 40, and a lower spooler 28e that spools and holds an active print job currently executed and a next print job to be printed next with regard to the lower printer 50. The various data included in the job folder 28a are a job script including specification of a printer and settings of the type and the size of printing paper, a layout script including settings required to specify a print layout, image data set in a photograph frame in the specified print layout, and an ICC profile attached to the image data. The printer use record database 28b stores a status (use) record of the upper printer 40, a status record of the lower printer 50, and a record of print jobs stored in the job folder 28a in the form of a database. The status record includes working statuses of relevant components, such as the number of reciprocating movements of an inkjet head 45c, error statuses, such as the occurrence of paper jam, expendable statuses, such as a remaining quantity of each ink kept in an ink cartridge 45b, and a count on a credit counter 44. The diverse programs stored in the program folder 28c include a printer driver for controlling the upper printer 40, a printer driver for controlling the lower printer 50, a color converter that generates a color correction table based on an ICC profile of a printer selected for a print job and an ICC profile attached to image data and implements color correction of the image data according to the generated color correction table, a print control execution program that controls execution of each printing instruction, a log upload program that uploads a log to the management server 70, and a Web browser that browses various pieces of information.

The upper printer 40 and the lower printer 50 are both inkjet printers of an identical model that use pigment inks and have high performances to output high-quality prints having extremely high light resistance. Since the upper printer 40 and the lower printer 50 have an identical configuration, the following description only regards the upper printer 40 (description of the lower printer 50 is omitted). The upper printer 40 has a CPU 41 that executes diverse operations and computations, a ROM 42 that stores a group of programs executed to, for example, specify the hardware settings, a RAM 43 that temporarily stores data in the course of diverse operations and computations executed by the CPU 41, a credit counter 44 that has been set to an initial value as a factory default and counts one down in response to one printing operation, and a printer engine 45 that carries out color printing. These components are mutually connected via a bus 46. The printer engine 45 has a carriage 45a that moves in a horizontal direction, an ink cartridge 45b that is mounted on the carriage 45a, an inkjet head 45c that is located below the ink cartridge 45b and ejects ink onto a sheet of printing paper M, and a roller 45d that is rotated to feed the sheet of printing paper M to a printing position of the inkjet head 45c. The ink cartridge 45b of this embodiment is an ink cartridge for color printing and keeps each of color pigment inks, cyan (C), magenta (M), yellow (Y), and black (K). As a matter of convenience, in the illustration of FIG. 1, only a credit counter 54 is shown as a component of the lower printer 50. The other components including a CPU are naturally included in the lower printer 50.

Each of the client PCs 60 is connected to the print server 20 and the router 14 via the LAN cable 16, and is linked with the management server 70 through the Internet 80 via the router 14. The client PC 60 is connectable with a digital still camera (DSC) 62 via a USB terminal and sends a print job for printing image data taken with the DSC 62 or retouched or otherwise processed image data to the print server 20 through the LAN cable 16. The client PC 60 also has the functions of activating the Web browser to log in the management server 70 and to receive diverse pieces of information regarding this photo studio system 10.

The management server 70 functions to concentrically manage the working statuses of many photo studio systems 10, which are installed in a large number of photo studios. The management server 70 is set at a different place from the photo studios. The management server 70 establishes communication with the print server 20 and the client PCs 60 of each photo studio system 10 via the Internet 80. The management server 70 includes a CPU that executes diverse operations and computations, a ROM that stores a group of programs executed to, for example, specify the hardware settings, a RAM that temporarily stores data in the course of diverse operations and computations executed by the CPU, and a hard disk that stores various databases. The management server 70 also has the functions of collecting diverse pieces of information from the print server 20 of the respective photo studio systems 10 and storing and managing the collected information in its databases. For example, the management server 70 functions to receive diverse pieces of information from each photo studio, calculate consumptions of expendables, such as printing papers and inks, in each photo studio based on the received information, and arrange supplies of the expendables and charge fees to each photo studio. The management server 70 further has the functions of providing the Web browser with the diverse pieces of information stored in its databases, in response to a log-in of the client PC 60 in each photo studio system 10 via the activated Web browser.

The photo studio system 10 of this embodiment constructed as discussed above prints image data according to the following procedure. The user takes a photograph of a desired subject with the DSC 62 and connects the DSC 62 to the USB terminal of the client PC 60 to move or copy desired image data from an internal image recording medium of the DSC 62 to the hard disk of the client PC 60. The hard disk of the client PC 60 accordingly stores the input image data. The user activates photo retouch software in the client PC 60 to retouch the input image data and utilizes the layout editing functions of the client PC 60 to specify a layout of the input image data on printing paper. In response to the user's click of a print button after the retouching or the layout, a printing instruction is output from the client PC 60 to the print server 20. The print server 20 stores various data included in the printing instruction output from the client PC 60 as a queuing print job into the job folder 28a. A unique job ID is allocated to each print job, as shown in FIG. 2. Each print job with a job ID includes page numbers and the numbers of copies of the respective pages. For example, in the example of FIG. 2, a print job with a job ID '00100' specifies printing two copies of a first page and two copies of a second page, that is, printing a total of four sheets. A print job with a job ID '00101' specifies printing one copy of a first page and one copy of a second page, that is, printing a total of two sheets. A print job with a job ID '00102' specifies printing three copies of a first page, that is, printing a total of three sheets.

Figure 3:
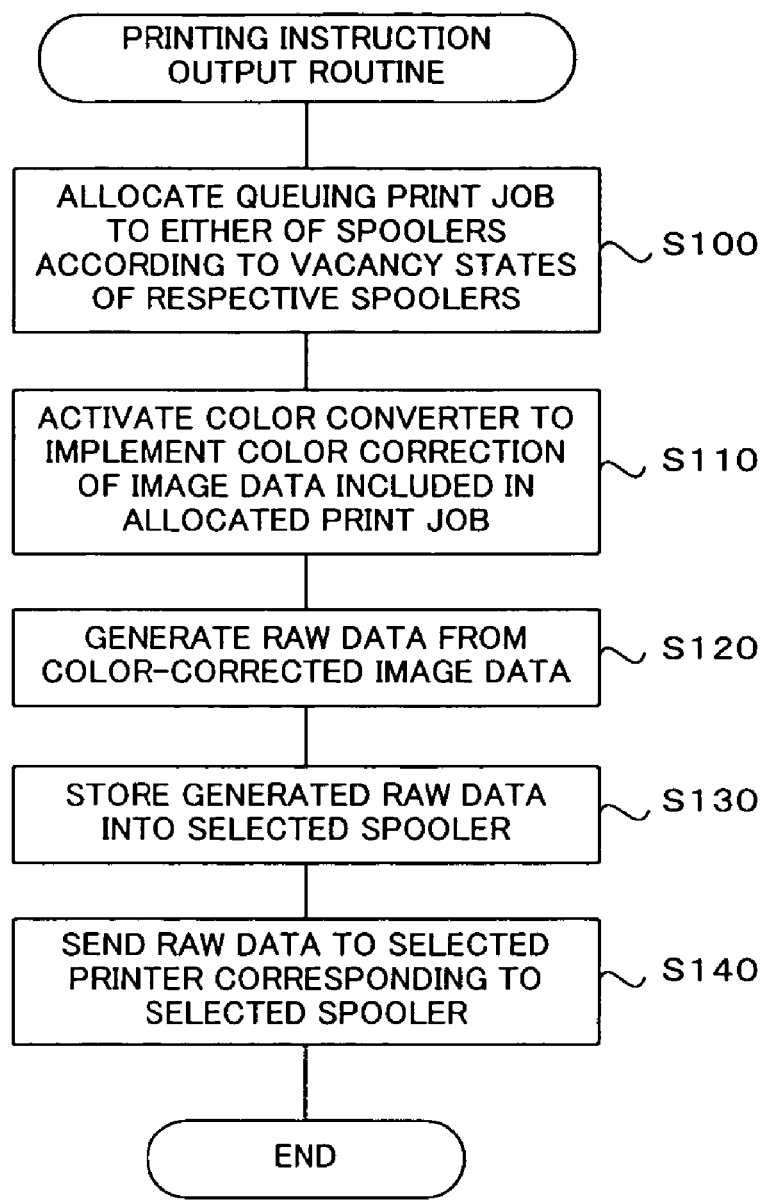
FIG. 3 is a flowchart showing a printing instruction output routine.

The CPU 21 of the print server 20 executes a printing instruction output routine shown in the flowchart of FIG. 3 according to a printing instruction output program read from the program folder 28c. When the printing instruction output routine starts, the CPU 21 first reads a queuing print job stored in the job folder 28a and allocates the queuing print job to either of the upper spooler 28d and the lower spooler 28e according to the vacancy statuses of the upper spooler 28d and the lower spooler 28e (step S100). After the allocation, the CPU 21 activates the color converter to implement color correction of image data included in the allocated print job (step S110), and activates the printer driver for the selected printer corresponding to the selected spooler to carry out color conversion into CMYK color data and a halftoning process and thereby generate RAW data printable by the selected printer (step S120). The CPU 21 stores the generated RAW data as a spool into the selected spooler (step S130) and outputs the RAW data to the selected printer corresponding to the selected spooler (step S140). The CPU 21 then exits from this printing instruction output routine. The selected printer 40 or 50 prints preset image data in a preset layout on a preset sheet of printing paper according to the received print job. As discussed later, each of the printers 40 and 50 sends the current status to the print server 20 on conclusion of every print job (see step S250 in the flowchart of FIG. 4). The print server 20 executes the printing instruction output routine at the received timing of the current status.

The description now regards the operations of the upper printer 40 included in the photo studio system 10 of the embodiment, more specifically a printing operation monitor process and a credit reset process executed by the upper printer 40. The operations of the lower printer 50 are not specifically described but are similar to those of the upper printer 40.

Figure 4:
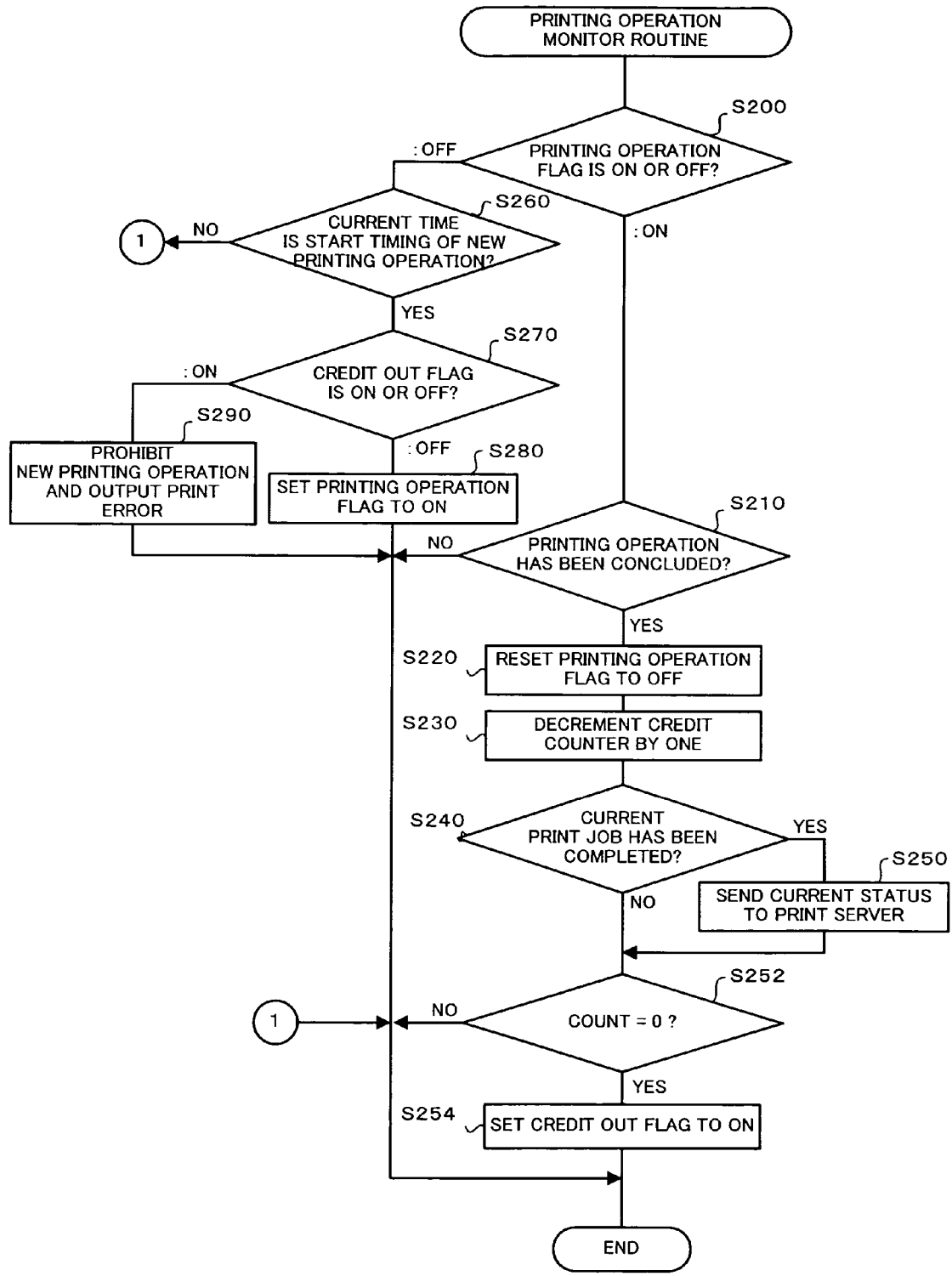
FIG. 4 is a flowchart showing a printing operation monitor routine.

FIG. 4 is a flowchart showing a printing operation monitor routine, which is executed by the CPU 41 of the upper printer 40. This routine is stored in the ROM 42 and is repeatedly read out and executed by the CPU 41 at preset time intervals (for example, at every several msec). When the printing operation monitor routine starts, the CPU 41 of the upper printer 40 first specifies the ON-OFF state of a printing operation flag, which is located in a predetermined area of the RAM 43 (step S200). The printing operation flag is set to the ON state during a printing operation of the upper printer 40 and is reset to the OFF state during no printing operation of the upper printer 40. The printing operation is here defined as a series of processing from a start of feeding one sheet of printing paper to conclusion of delivery of a printed sheet, regardless of actual execution or non-execution of printing.

When the printing operation flag is ON at step S200, that is, during a printing operation of the upper printer 40, the CPU 41 subsequently determines whether the current printing operation in execution has been concluded (step S210). When the current printing operation has not yet been concluded, the CPU 41 immediately exits from this printing operation monitor routine. When it is determined at step S210 that the current printing operation has been concluded, the CPU 41 resets the printing operation flag to the OFF state (step S220), decrements the count on the credit counter 44 by one (step S230), and determines whether a current print job has been completed (step S240). When the current print job has not yet been completed, the routine proceeds to step S252. When the current print job has been completed, on the other hand, the CPU 41 sends a current status of the upper printer 40 to the print server 20 (step S250) and goes to step S252. The current status of the upper printer 40 is defined by a count on the credit counter 44 at the start of the print job and a count at the end of the print job. At step S252, it is determined whether the current count on the credit counter 44 is equal to zero. The credit counter 44 is a down counter that has been set to an initial value as a factory default and is decremented by one in response to each printing operation. Subtraction of the current count on the credit counter 44 from the initial setting accordingly gives the actual number of printing operations. When it is determined at step S252 that the current count on the credit counter 44 is not equal to zero, the CPU 41 exits from this printing operation monitor routine. When it is determined at step S252 that the current count on the credit counter 44 is equal to zero, on the other hand, the CPU 41 sets a credit out flag to the ON state (step S254) and exits from the printing operation monitor routine. The credit out flag is set to the ON state when the count on the credit counter 44 is equal to zero, and is otherwise reset to the OFF state.

When the printing operation flag is OFF at step S200, that is, during no printing operation of the upper printer 40, the CPU 41 subsequently determines whether the current time is a start timing of a new printing operation (step S260). When the current time is a start timing of a new printing operation at step S260, the CPU 41 specifies the ON-OFF state of the credit out flag (step S270). The OFF state of the credit out flag at step S270 means that the current count on the credit counter 44 is one or a greater value. The CPU 41 accordingly gives a permission to start a new printing operation and sets the printing operation flag to the ON state (step S280), before exiting from the printing operation monitor routine. The ON state of the credit out flat at step S270 means that the current count on the credit counter 44 is equal to zero. The CPU 41 accordingly prohibits starting a new printing operation and outputs a print error to the print server 20 and the client PC 60 (step S290), before exiting from the printing operation monitor routine. The print server 20 or the client PC 60 receives the print error and outputs a print error message and a message to recommend connection of the print server 20 with the management server 70 in a visually or auditorily recognizable form. On this occasion, the user often gives an input to connect the print server 20 with the management server 70 via the Internet 80.

Figure 5:
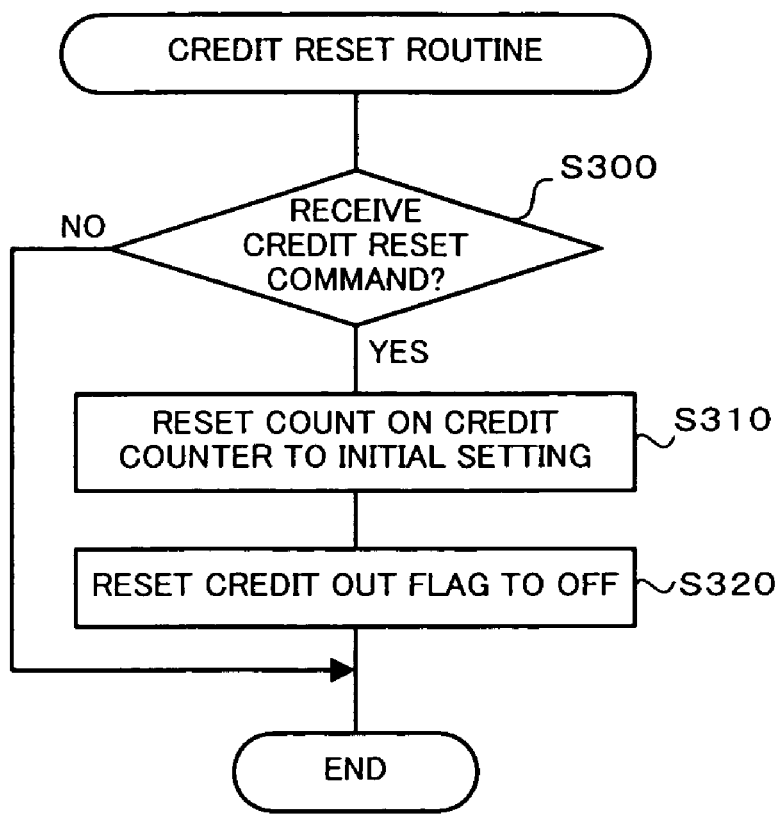
FIG. 5 is a flowchart showing a credit reset routine.

FIG. 5 is a flowchart showing a credit reset routine, which is executed by the CPU 41 of the upper printer 40. This routine is stored in the ROM 42 and is repeatedly read out and executed by the CPU 41 at preset time intervals (for example, at every several msec). When the credit reset routine starts, the CPU 41 of the upper printer 40 first determines whether a credit reset command is received from the print server 20 (step S300). The credit reset command is sent from the print server 20 when connection of the print server 20 with the management server 70 is successfully established (see step S430 in the flowchart of FIG. 6 discussed later). When the credit reset command is received at step S300, the CPU 41 resets the count on the credit counter 44 to the initial setting (step S310) and resets the credit out flag, which is located in a predetermined area of the RAM 43, to the OFF state (step S320). When no credit reset command is received at step S300 or after the credit out flag is reset to the OFF state at step S320, the credit reset routine is terminated.

The initial value of the credit counter 44 is set, based on log upload timings of the print server 20. A time period between a time point of an upload of log information from the print server 20 to the management server 70 and a time point of a next upload of log information is fixed to a predetermined time interval (12 hours in this embodiment). The method of setting calculates the maximum number of physically printable pages by the upper printer 40 in this time interval. One concrete procedure specifies a time required for printing standard image data having a standard volume on paper of a size A4 and divides the predetermined time interval by the specified time to calculate the maximum number of physically printable pages. The actual printing operation may, however, print image data on paper of a smaller size than A4 or print image data having a less volume than the standard image data. The procedure accordingly adds a marginal number of pages determined by taking into account the actual printing operations to the calculated maximum number of physically printable pages, so as to set the initial value. Setting the initial value on the credit counter 44 in the upper printer 40 allows the upper printer 40 to carry out a specific number of printing operations corresponding to the initial setting.

Figure 6:
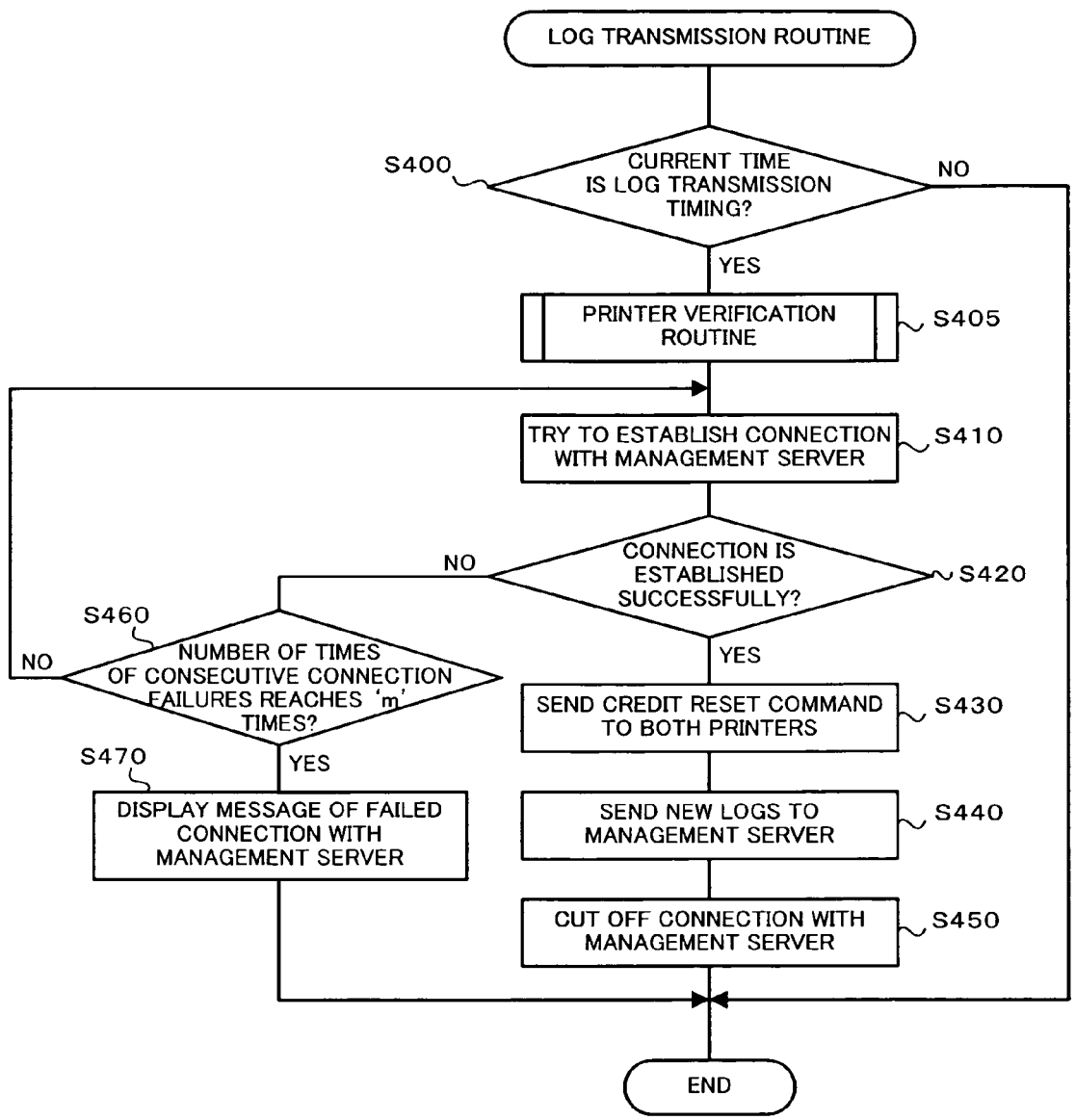
FIG. 6 is a flowchart showing a log transmission routine.

The following describes the operations of the print server 20 in the photo studio system 10 of the embodiment, especially a process of uploading logs representing the statuses of the printers 40 and 50 to the management server 70. FIG. 6 is a flowchart showing a log transmission routine, which is executed by the CPU 21 of the print server 20. This routine is stored in the program folder 28c and is repeatedly read out and executed by the CPU 21 at preset time intervals (for example, at every several msec). When the log transmission routine starts, the CPU 21 of the print server 20 first determines whether the current time is a log transmission timing (step S400). The log transmission timing comes at a start of the print server 20 or with elapse of every predetermined time interval after the start of the print server 20. In this embodiment, the predetermined time interval is fixed to 12 hours as mentioned above.

When it is determined at step S400 that the current time is a log transmission timing, the CPU 21 executes a printer verification routine discussed later (step S405) and tries to gain access to the management server 70 via the Internet 80 (step S410). The CPU 21 then determines whether connection with the management server 70 is established successfully (step S420). In the case of successful connection with the management server 70 at step S420, the CPU 21 sends the credit reset command to both the printers 40 and 50 to reset the counts on the respective credit counters 44 and 54 to the initial settings (step S430). Each of the printers 40 and 50 accordingly resets the count on the credit counter 44 or 54 to the initial setting at step S310 in the credit reset routine shown in FIG. 5. The CPU 21 of the print server 20 subsequently sends records of the statuses of the printers 40 and 50 and a record of print jobs, which are stored in the print use record database 28b, as log information to the management server 70 (step S440), and cuts off the connection with the management server 70 on completion of the transmission (step S450). Only new records, which have not yet been transmitted to the management server 70, are sent to the management server 70 as log information at step S440. The management server 70 receives the transmitted log information, calculates consumptions of expendables, such as printing papers and inks, in the corresponding photo studio based on the received log information, and charges fees and arranges supplies of expendables to the photo studio. In the case of failed connection with the management server 70 at step S420, on the other hand, the CPU 21 determines whether connection with the management server 70 fails a preset consecutive number of times ('m' times) (step S460). When the number of times of consecutive connection failures is less than 'm' times, the routine returns to step S410 to try again to gain access to the management server 70. When the number of times of consecutive connection failures reaches the 'm' times, on the other hand, some trouble or failure, such as breaking of the LAN cable 16 or malfunction of the router 14, is expected. The CPU 21 accordingly shows a message of failed connection with the management server 70 on the display 27 (step S470). When the current time is not a log transmission timing at step S400, after the connection with the management server 70 is cut off at step S450, or after the message of failed connection is shown on the display 27 at step S470, the log transmission routine is terminated. The print server 20 receives the current status of the printer 40 or 50 every time the printer 40 or 50 completes a print job (see step S250 in the flowchart of FIG. 4), and stores the received status into the printer use record database 28b. The user is allowed to try to establish connection between the print server 20 and the management server 70 at any arbitrary timing.

The photo studio system 10 executes the programs according to the three flowcharts of FIGS. 4 through 6 to print image data. The credit counter 44 of the printer 40 has been set to the initial value as a factory default. The printer 40 executes the printing operation monitor routine shown in the flowchart of FIG. 4 in the course of printing image data. The count on the credit counter 44 is decremented by one, in response to completion of each printing operation. The count on the credit counter 44 accordingly approaches to zero, as the number of printed sheets increases. The print server 20 executes the log transmission routine shown in the flowchart of FIG. 6 to establish connection with the management server 70 and send the credit reset command to the printer 40 at each log transmission timing. The printer 40 executes the credit reset routine shown in the flowchart of FIG. 5 to reset the count on the credit counter 44 to the initial setting. As long as the print server 20 successfully establishes connection with the management server 70 at each log transmission timing, the count on the credit counter 44 is reset to the initial setting. Regardless of frequent execution of the printing operation monitor routine, the count on the credit counter 44 does not reach zero, and the printer 40 is allowed to continuously carry out printing operations. When the print server 20 fails to establish connection with the management server 70 at a log transmission timing, however, the count on the credit counter 44 is not reset to the initial setting. As the printing operation monitor routine is executed many times, the count on the credit counter 44 reaches zero and the credit out flag is set to the ON state. The printer 40 accordingly fails to start a printing operation in the printing operation monitor routine. Even when the credit out flag is ON, successful establishment of connection with the management server 70 enables the print server 20 to send the credit reset command to the printer 40. The printer 40 then resets the count on the credit counter 44 to the initial setting and resets the credit out flag to the OFF state, thereby resuming printing operations. The above description with regard to the printer 40 is also applied to the printer 50.

The printers 40 and 50 are not allowed to continue printing operations over a long time period in the state of disconnection of the print server 20 from the management server 70, that is, while the management server 70 fails to receive the statuses of the printers 40 and 50. This arrangement desirably prevents the operator of the management server 70 from suffering significant losses. An error message is given to the print server 20 and the client PC 60. On this occasion, the user is expected to connect the print server 20 with the management server 70. This also protects the operator of the management server 70 from remarkable losses. Restrictions on the printing operations of the printer 40 or 50 and the output of the error message effectively inform the user of the occurrence of some trouble or failure in the system. When the print server 20 successfully establishes connection with the management server 70, the printer 40 or 50 resets the count on the credit counter 44 or 54 to the initial setting. The print server 20 automatically tries to establish connection with the management server 70 via the Internet 18 at a start or with elapse of every predetermined time interval after the start. The user is thus generally not required to connect the print server 20 with the management server 70. The initial value set on the credit counter 44 or 54 is determined by adding a preset marginal number of pages to the maximum number of physically printable pages by the printer 40 or 50 in the predetermined time interval. The count on the credit counter 44 or 54 reaching zero thus means that the print server 20 fails to establish connection with the management server 70 after elapse of the predetermined time interval. The print server 20 also tries to establish connection with the management server 70 via the Internet 80, in response to the user's instruction given at any arbitrary timing. This arrangement enables the user to eliminate restrictions on printing operations of the printer 40 or 50 at the arbitrary timing.

The printer verification routine executed at step S405 in the log transmission routine of FIG. 6 is discussed with reference to the flowchart of FIG. 7. When the printer verification routine starts, the CPU 21 of the print server 20 first determines the number of printing operations carried out in the predetermined time interval between a previous cycle of log transmission and a current cycle (step S510). The count on the credit counter 44 has been reset to the initial setting on the occasion of previous successful connection of the print server 20 with the management server 70 and has been decremented by one in response to each printing operation. Subtraction of the current count on the credit counter 44 from the initial setting accordingly gives the actual number of printing operations by the printer 40 in the predetermined time interval. The CPU 21 subsequently reads the numbers of copies with regard to respective print jobs, which have been stored in the printer use record database 28b in the predetermined time interval since the previous log transmission from the print server 20 to the management sever 70 and sums up the numbers of copies to calculate the total number of printed sheets by the printer 40 (step S520). The CPU 21 then calculates a ratio of the actual number of printing operations by the printer 40 to the total number of printed sheets by the printer 40 for the purpose of comparison (step S530), and determines whether the calculated ratio is within a preset allowable range (step S540). In actual use, some print error or paper jam may arise to cause a failure of printing. The allowable range is accordingly set by taking into account the assumption that the actual number of printing operations is often slightly greater than the total number of printed sheets. When the calculated ratio is within the preset allowable range at step S540, the CPU 21 determines that the current working status of the printer 40 is appropriate (step S550). When the calculated ratio is out of the preset allowable range at step S540, on the other hand, the CPU 21 determines that the current working status of the printer 40 is inappropriate (step S560). After the processing of step S550 or step S560, the result of verification of the printer 40, that is, the appropriate status or the inappropriate status, is added to the log information (step S570). The printer verification routine is then terminated. The log information with the current working status of the printer added thereto is accordingly sent to the management server 70 at step S440 in the log transmission routine of FIG. 6. The above description with regard to the printer 40 is also applied to the printer 50.

Figure 7:
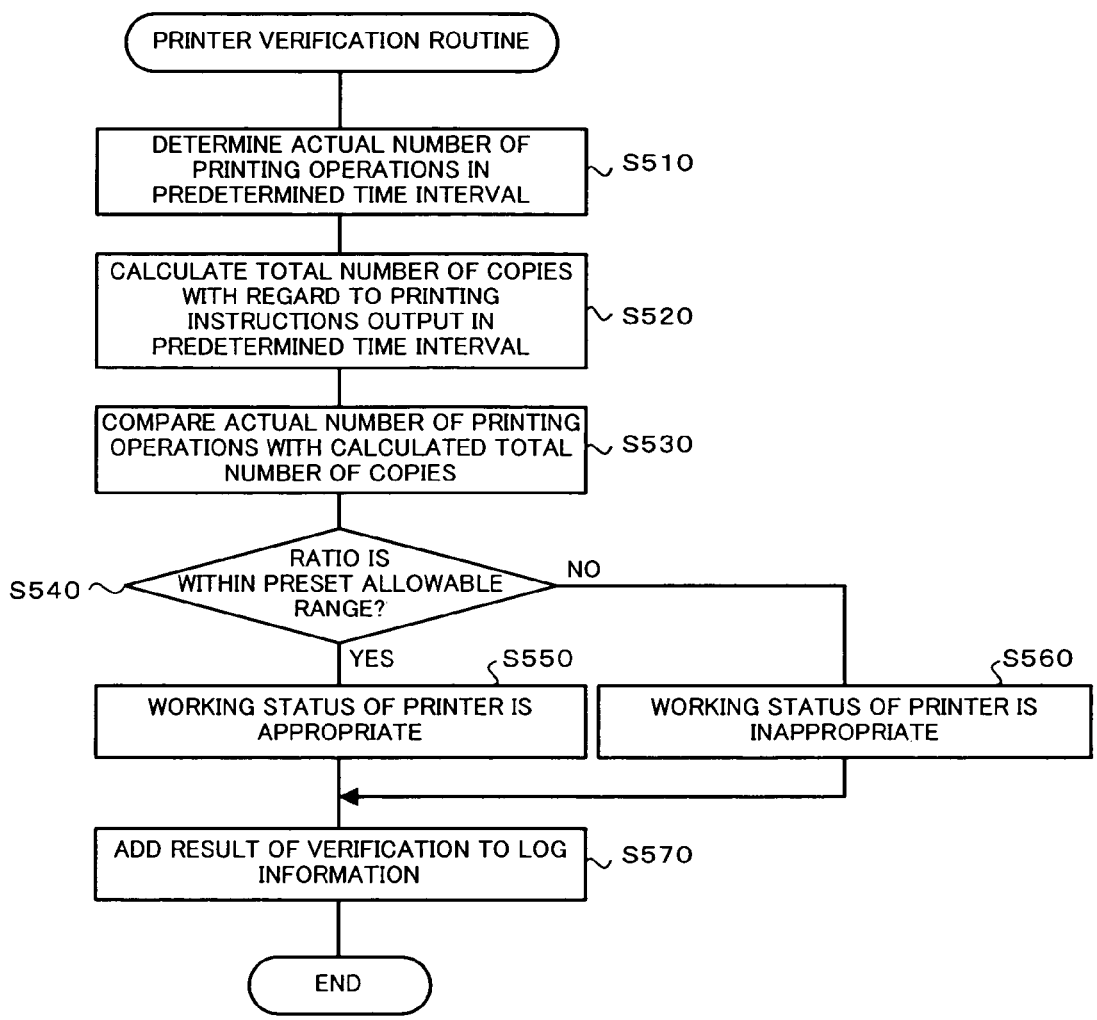
FIG. 7 is a flowchart showing a printer verification routine.

FIG. 8 shows an example of the appropriate working status and the inappropriate working status of the printer 40 verified in the printer verification routine of FIG. 7. In this example, the printer 40 has carried out three print jobs having job IDs '00100', '00101', and '00102' in a predetermined time interval, and the numbers of copies with regard to the respective print jobs are 4, 2, and 3. Namely the total number of copies within the predetermined time interval is 9. The allowable range is set to be 100% to 150% of the total number of copies. The initial setting on the credit counter 44 is 250. In the state of FIG. 8(a), the count on the credit counter 44 is 240 in the current cycle of the printer verification routine. The total number of printing operations in the predetermined time interval is thus calculated as 250−240=10 (times). The ratio of the total number of printing operations to the total number of copies (9 pages) is approximately 110%, which is within the preset allowable range. The working status of the printer 40 is thus determined as appropriate. In the state of FIG. 8(b), on the other hand, the count on the credit counter 44 is 187 in the current cycle of the printer verification routine. The total number of printing operations in the predetermined time interval is thus calculated as 250−187=63 (times). The ratio of the total number of printing operations to the total number of copies (9 pages) is 700%, which is out of the preset allowable range. The working status of the printer 40 is thus determined as inappropriate.

The verification process compares the total number of printed sheets with regard to the printing instructions output to the printer 40 in the predetermined time interval with the total number of printing operations counted on the printer 40 in the predetermined time interval and verifies the working status of the printer 40 based on the result of the comparison. This method requires the predetermined time interval for verification of the working status of each printer, but readily detects the inappropriate working status of the printer. This is especially effective for roughly checking the working status of the printer in the predetermined time interval. The print server 20 is notified of the current working status of the printer 40, prior to transmission of the log information on the printer 40 to the management server 70. The processing routine may be modified to cause the print server 20 to establish connection with the management server 70 only when the working status of the printer 40 is appropriate. This arrangement desirably prevents transmission of indefinite log information to the management server 70, while restricting the printing operations of the printer 40 by no output of the credit reset command. The above description of the effects of the technique of this embodiment with regard to the printer 40 is also applied to the printer 50.

The credit counters 44 and 54 of the printers 40 and 50 in the photo studio system 10 of the first embodiment correspond to the counting module of the invention. The CPU 41 of the printer 40 and the CPU (not shown) of the printer 50 correspond to the count judgment module, the printing operation restriction module, the count setting module, and the error output module of the invention. The CPU 21 of the print server 20 corresponds to the connection detection module, the auto connection trial module, and the command output module of the invention. The CPU 21 of the print server 20 also corresponds to the printing instruction output module (see step S140 in the printing instruction output routine of FIG. 3), the operation number input module (see step S250 in the printing operation monitor routine of FIG. 4), and the verification module (see the printer verification routine of FIG. 7) of the invention. The description of the operations of the photo studio system 10 in the first embodiment clarifies one example of the print system control method of the invention.

In the first embodiment discussed above, the printing operation is defined as a series of processing from a start of feeding one sheet of printing paper to conclusion of delivery of a printed sheet, regardless of actual execution or non-execution of printing. The printing operation may alternatively be defined as a series of processing from a start of feeding one sheet of printing paper to conclusion of delivery of a printed sheet under the condition of actual execution of printing. Such modification is also applicable to the technique of a second embodiment discussed later.

In the first embodiment discussed above, the count on the credit counter 44 is reset to the initial setting (the number of printing operations is reset to zero) at step S310 in the credit reset routine of FIG. 5. One possible modification may set a smaller value than the initial value to the count on the credit counter 44. In this modified structure, successful establishment of connection between the print server 20 and the management server 70 enables the printer 40 or 50 to continuously carry out printing operations, although the number of printing operations allowed in the predetermined time interval is reduced from the initial setting.

In the structure of the first embodiment discussed above, down counters are applied to the credit counters 44 and 54. The credit counters 44 and 54 may alternatively be up counters, which are incremented by one in response to each printing operation. In this modified structure, the count on the up counter is reset to zero at step S310 in the credit reset routine of FIG. 5, and the credit out flag is set to the ON state when the count on the up counter reaches a preset value (the initial setting in the first embodiment discussed above) at step S252 in the printing operation monitor routine of FIG. 4. Subtraction of the count on the down counter from the initial setting (the preset value) gives the actual number of printing operations in the structure of the first embodiment, while the count on the up counter directly shows the actual number of printing operations in this modified structure.

In the first embodiment discussed above, the initial value set on the credit counter 44 or 54 is determined by adding a preset marginal number of pages to the maximum number of physically printable pages by the printer 40 or 50 in a predetermined time interval. One possible modification may empirically specify the user's printing frequency with the printer 40 or 50 in a predetermined time interval and determine the initial setting on the credit counter 44 or 54 based on the empirically specified printing frequency. For example, when the user's printing frequency corresponds to 30% of the maximum capacity of the printer 40 or 50, the initial setting on the credit counter 44 or 54 is determined by adding a preset marginal number of pages to a number of pages printed by the printer 40 or 50 at 30% of the maximum capacity in the predetermined time interval. The predetermined time interval may be varied according to the user's printing frequency. One applicable method sets a longer time interval in the case of a lower printing frequency, while setting a shorter time interval in the case of a higher printing frequency. This arrangement effectively restricts printing operations of the printer 40 or 50 at an adequate timing according to the user's printing frequency with the printer 40 or 50 after disconnection from the management server 70.

The procedure of the first embodiment outputs the credit reset command to the printers 40 and 50 on the occasion of successful establishment of connection between the print server 20 and the management server 70. One possible modification may output the credit reset command to the printers 40 and 50 only when the print server 20 successfully establishes connection with the management server 70 and sends the statuses of the printers 40 and 50 (including records of statuses of the printers 40 and 50 and a record of print jobs) to the management server 70. This arrangement eliminates restrictions on printing operations of the printers 40 and 50, only when the management server 70 receives the statuses of the printers 40 and 50 to adequately manage the photo studio system 10. The management server 70 accordingly does not suffer significant losses.

The procedure of the first embodiment carries out the printer verification routine shown in FIG. 7 as one step of the log transmission routine shown in FIG. 6. One possible modification may carry out a printer verification routine shown in FIG. 9 when the print server 20 receives the current status from the printer 40. The credit counter 44 on the upper printer 40 decrements the count by one in response to each printing operation and is thus regarded as a counter to serially accumulate the number of printing operations. When the printer verification routine shown in the flowchart of FIG. 9 starts, the CPU 21 of the print server 20 first stores a currently received status of the printer 40 into the printer use record database 28b (step S600) and reads the count on the credit counter 44 at the start of a current print job from the currently received status of the printer 40 (step S610). The CPU 21 subsequently reads the count on the credit counter 44 at the end of a previous print job from a previously received status of the printer 40 (step S620), compares the two counts (step S630), and determines whether a difference between the two counts is within a preset allowable range (step S640). In actual use, test printing may be performed between the end of a previous print job and the start of a current print job. The allowable range is thus set by taking into account such a potential for test printing. When the difference between the two counts is within the preset allowable range at step S640, the CPU 21 determines that the current working status of the printer 40 is appropriate (step S650). When the difference between the two counts is out of the preset allowable range at step S640, on the other hand, the CPU 21 determines that the current working status of the printer 40 is inappropriate (step S660). After the processing of step S650 or step S660, the result of verification of the printer 40, that is, the appropriate status or the inappropriate status, is added to the current status stored in the printer use record database 28b (step S670). The printer verification routine is then terminated. The log information with the current working status of the printer added thereto is accordingly sent to the management server 70 at step S440 in the log transmission routine of FIG. 6. The above description with regard to the printer 40 is also applied to the printer 50.

Figure 9:
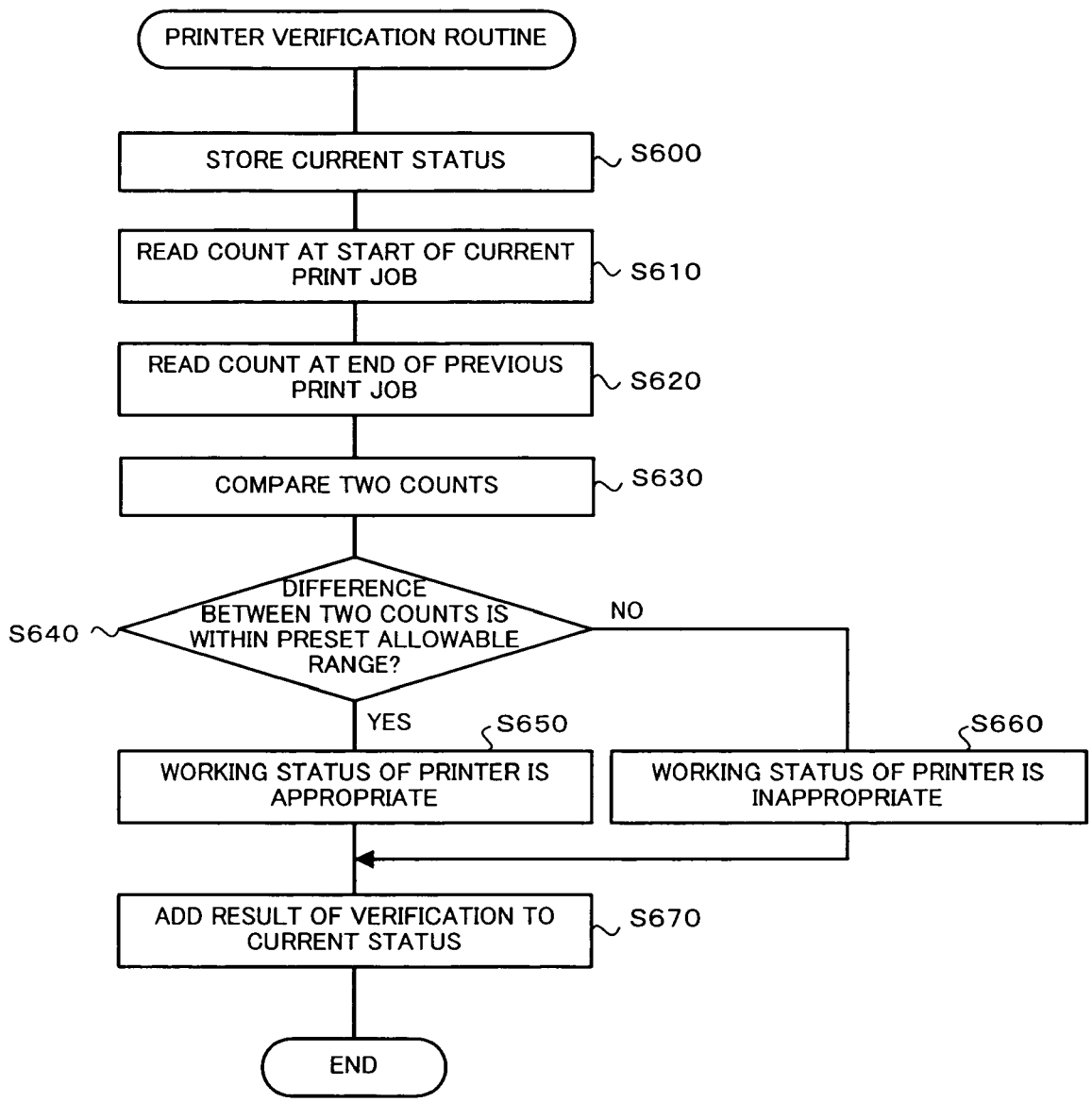
FIG. 9 is a flowchart showing a printer verification routine in one modified structure.

FIG. 10 shows an example of the appropriate working status and the inappropriate working status of the printer 40 verified in the printer verification routine of FIG. 9. In this example, a current print job has a job ID '00102' and a previous print job has a job ID '00101', and the numbers of copies with regard to the current print job and the previous print job are 3 and 2. The allowable range is set to be not less than 0 and not greater than 3. In the state of FIG. 10(a), the count on the credit counter 44 at the start of the current print job is 243, while the count on the credit counter 44 at the end of the previous print job is 243. The difference between the two counts is 243−243=0, which is within the preset allowable range. The working status of the printer 40 is accordingly determined as appropriate. In the state of FIG. 10(b), on the other hand, the count on the credit counter 44 at the start of the current print job is 190, while the count on the credit counter 44 at the end of the previous print job is 218. The difference between the two counts is 218−190=28, which is out of the preset allowable range. The working status of the printer 40 is accordingly determined as inappropriate. The printer verification routine of FIG. 9 also readily detects the inappropriate working status of the printer. This method is especially effective for determining whether the printer 40 receives any unauthorized printing instruction from any computer other than the print server 20 to carry out a foreign print job between the previous print job and the current print job.

Figure 11:
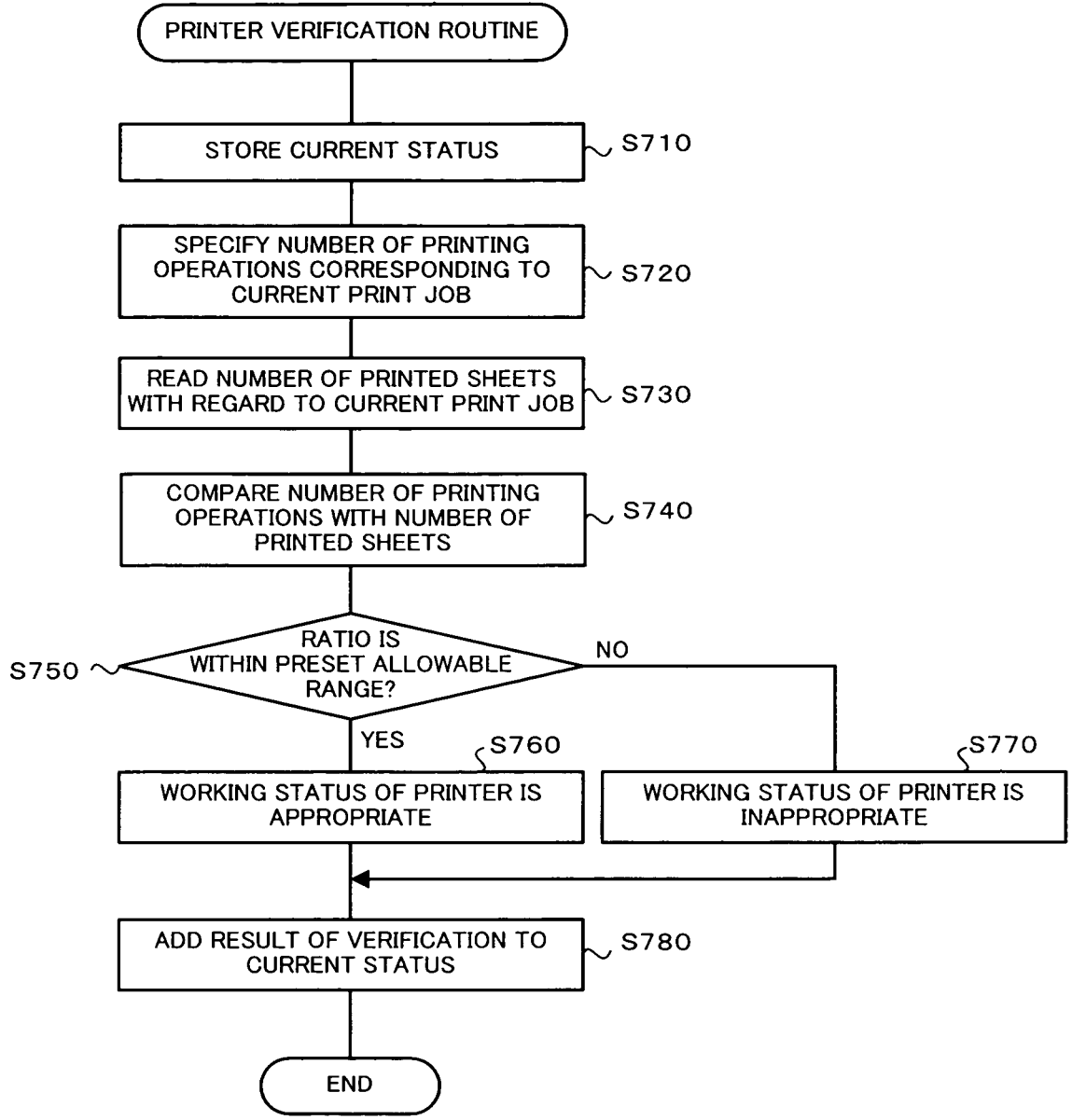
FIG. 11 is a flowchart showing a printer verification routine in another modified structure.

Another possible modification of the first embodiment may carry out a printer verification routine shown in FIG. 11 when the print server 20 receives the current status from the printer 40. When the printer verification routine shown in the flowchart of FIG. 11 starts, the CPU 21 of the print server 20 first stores a currently received status of the printer 40 into the printer use record database 28b (step S710) and reads the counts on the credit counter 44 at the start of a current print job and at the end of the current print job from the currently received status and specifies a difference between the two counts as a number of printing operations corresponding to the current print job (step S720). The CPU 21 subsequently reads the number of copies, that is, the number of printed sheets, with regard to the current print job (step S730), calculates a ratio of the number of printing operations to the number of copies (step S740), and determines whether the calculated ratio is within a preset allowable range (step S750). In actual use, some print error or paper jam may arise to cause a failure of printing. The allowable range is accordingly set by taking into account the assumption that the number of printing operations corresponding to a print job is often slightly greater than the number of printed sheets with regard to the print job. When the calculated ratio is within the preset allowable range at step S750, the CPU 21 determines that the current working status of the printer 40 is appropriate (step S760). When the calculated ratio is out of the preset allowable range at step S750, on the other hand, the CPU 21 determines that the current working status of the printer 40 is inappropriate (step S770). After the processing of step S760 or step S770, the result of verification of the printer 40, that is, the appropriate status or the inappropriate status, is added to the current status stored in the printer use record database 28b (step S780). The printer verification routine is then terminated. The log information with the current working status of the printer added thereto is accordingly sent to the management server 70 at step S440 in the log transmission routine of FIG. 6. The above description with regard to the printer 40 is also applied to the printer 50.

FIG. 12 shows an example of the appropriate working status and the inappropriate working status of the printer 40 verified in the printer verification routine of FIG. 11. In this example, a current print job has a job ID '00102' and the number of copies with regard to the current print job is 3. The allowable range is set to be 100% to 150%. In the state of FIG. 12(a), the count on the credit counter 44 at the start of the current print job is 243 and the count at the end of the current print job is 240. The number of printing operations corresponding to the current print job is accordingly 243−240=3. The number of printed sheets with regard to the current print job is 3. The ratio of the number of printing operations to the number of printed sheets is 100%, which is within the preset allowable range. The current working status of the printer 40 is thus determined as appropriate. In the state of FIG. 12(b), on the other hand, the count on the credit counter 44 at the start of the current print job is 190 and the count at the end of the current print job is 157. The number of printing operations corresponding to the current print job is accordingly 190−157=33. The ratio of the number of printing operations to the number of printed sheets is 1100% (33/3=11), which is out of the preset allowable range. The current working status of the printer 40 is thus determined as inappropriate. The printer verification routine of FIG. 11 also readily detects the inappropriate working status of the printer. This method is especially effective for verifying the printing operation of the printer 40 with regard to each print job.

In the structure of the first embodiment, the print server 20 executes the printer verification routine. In one modified structure, the management server 70 may execute the print verification routine. The management server 70 receives the log information sent from the print server 20. The log information represents a record of print jobs and records of statuses of the printers 40 and 50 and accordingly includes information on the credit counters 44 and 54. The management server 70 can thus carry out the printer verification routine according to the same procedure as the processing flow by the print server 20. The operator of the management server 70 effectively verifies the working statuses of the printers 40 and 50 and accurately grasps the use records of the printers 40 and 50.

Second Embodiment

The structure and the operations of a second embodiment are similar to those of the first embodiment, except a printer verification routine. The following description focuses on such differences from the first embodiment.

Figure 13:
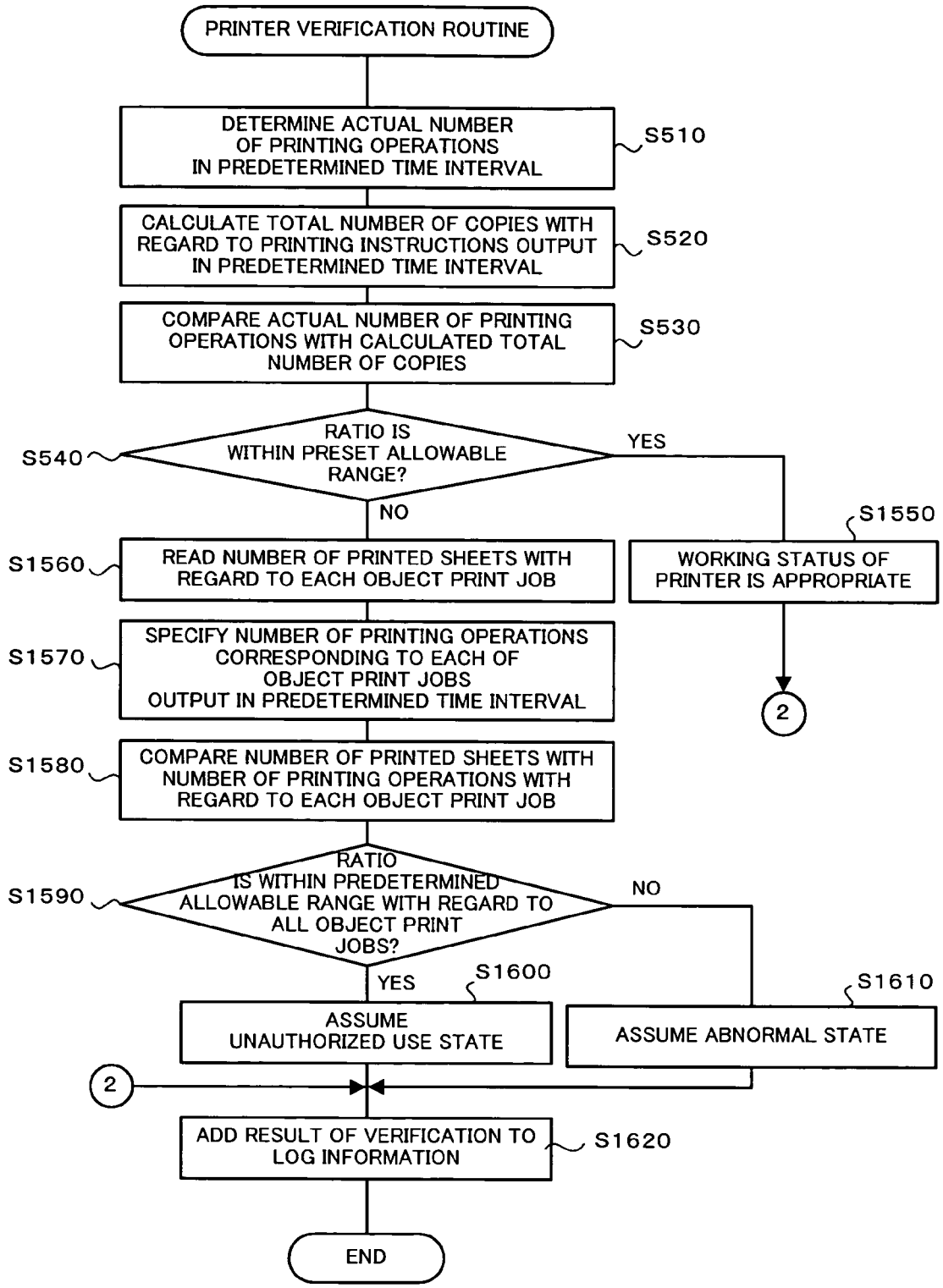
FIG. 13 is a flowchart showing a printer verification routine in a second embodiment.

In the second embodiment, a verification routine shown in the flowchart of FIG. 13 is executed at step S405 in the log transmission routine of FIG. 6. When this printer verification routine starts, the CPU 21 of the print server 20 executes the processing of steps S510 through S540, which is identical with that of the first embodiment discussed above with reference to the flowchart of FIG. 7. At step S540, the CPU 21 determines whether the calculated ratio of the actual number of printing operations by the printer 40 to the total number of printed sheets by the printer 40 is within a preset allowable range. When the calculated ratio is within the preset allowable range at step S540, the CPU 21 determines that the current working status of the printer 40 is appropriate (step S1550). The CPU 21 adds the result of verification to the log information (step S1620), and exits from this printer verification routine. When the calculated ratio is out of the preset allowable range at step S540, the CPU 21 determines that the current working status of the printer 40 is inappropriate and compares the number of printing operations corresponding to each of the object print jobs with the number of printed sheets with regard to the object print job. The CPU 21 reads the number of copies, that is, the number of printed sheets, with regard to each of the object print jobs output to the printer 40 in a predetermined time interval between a previous cycle of log transmission and a current cycle (step S1560) and specifies the number of printing operations corresponding to each of the object print jobs (step S1570). The concrete procedure reads the counts on the credit counter 44 at the start of each object print job and at the end of the object print job and specifies a difference between the two counts as a number of printing operations with regard to the object print job. The CPU 21 subsequently calculates a ratio of the number of printing operations corresponding to each of the object print jobs to the number of printed sheets with regard to the object print job (step S1580) and determines whether the calculated ratio is within a predetermined allowable range with regard to all the object print jobs (step S1590). In actual use, some print error or paper jam may arise to cause a failure of printing. The allowable range is accordingly determined by taking into account the assumption that the number of printing operations corresponding to a print job is often slightly greater than the number of printed sheets with regard to the print job. When the calculated ratio is within the predetermined allowable range with regard to all the object print jobs at step S1590, this means that the ratio of the actual number of printing operations to the total number of copies is out of the preset allowable range, regardless of the normal printing operations of the printer 40 following the printing instructions. The CPU 21 accordingly assumes that the printer 40 receives any unauthorized printing instruction from any computer other than the print server 20 to carry out an illegal printing operation and thus falls into an unauthorized use state (step S1600). When the calculated ratio is out of the predetermined allowable range with regard to any of the object print jobs at step S1590, on the other hand, there is a possibility that any failure or trouble arising in the printer 40 causes the ratio of the actual number of printing operations to the total number of copies to be out of the preset allowable range. The CPU 21 accordingly assumes that the printer 40 falls into an abnormal state (step S1610). After the processing of either step S1600 or step S1610, the CPU 21 adds the result of verification of the printer 40, that is, the appropriate status or the inappropriate status, to the log information and in the case of the inappropriate status, also adds the result of assumption, that is, the unauthorized use state or the abnormal state, to the log information (step S1620). The printer verification routine is then terminated. The log information with the current working status of the printer added thereto is accordingly sent to the management server 70 at step S440 in the log transmission routine of FIG. 6. The above description with regard to the printer 40 is also applied to the printer 50.

Figure 14:
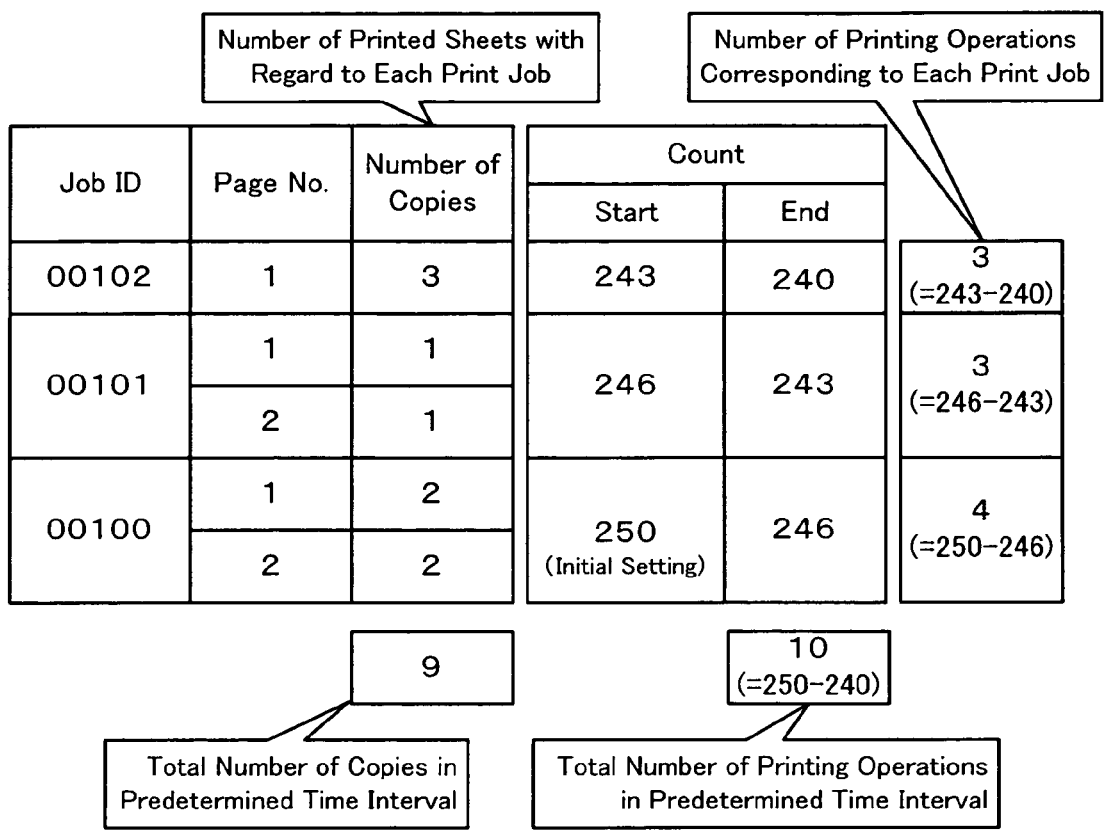
FIG. 14 shows one example of an appropriate working status of the printer in the second embodiment.
Figure 15:
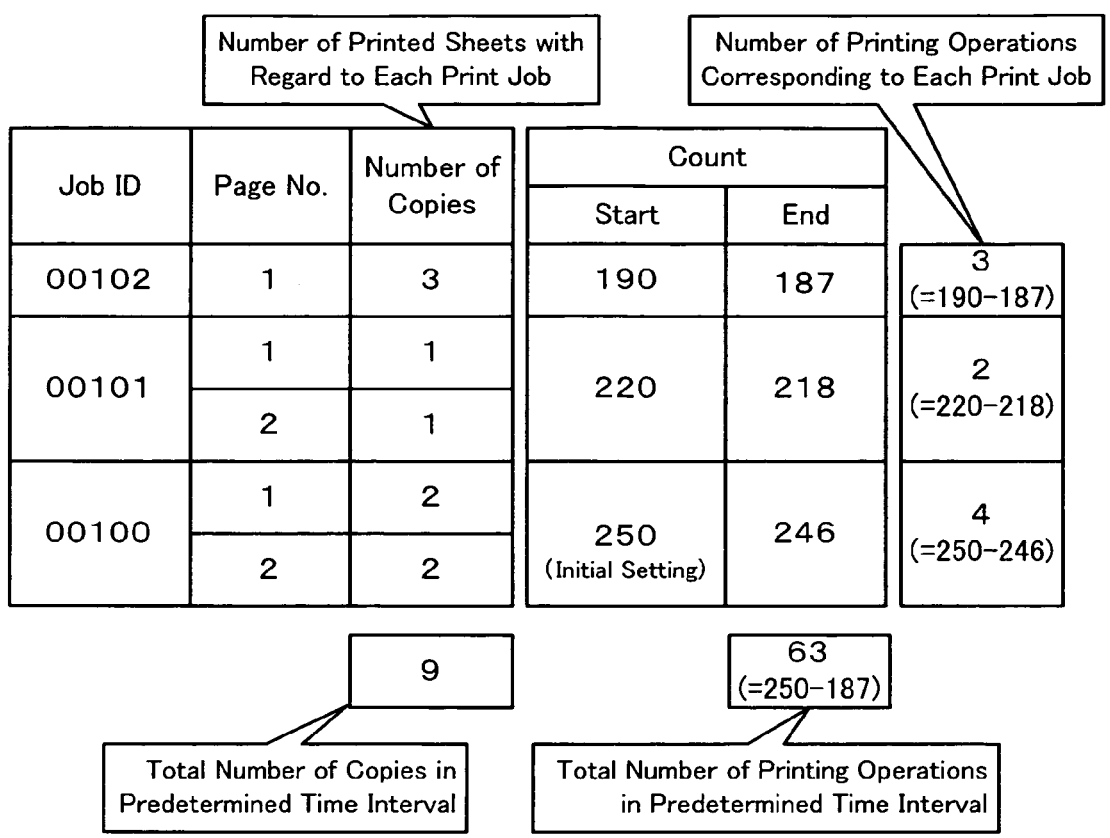
FIG. 15 shows one example of an unauthorized use state of the printer in the second embodiment.
Figure 16:
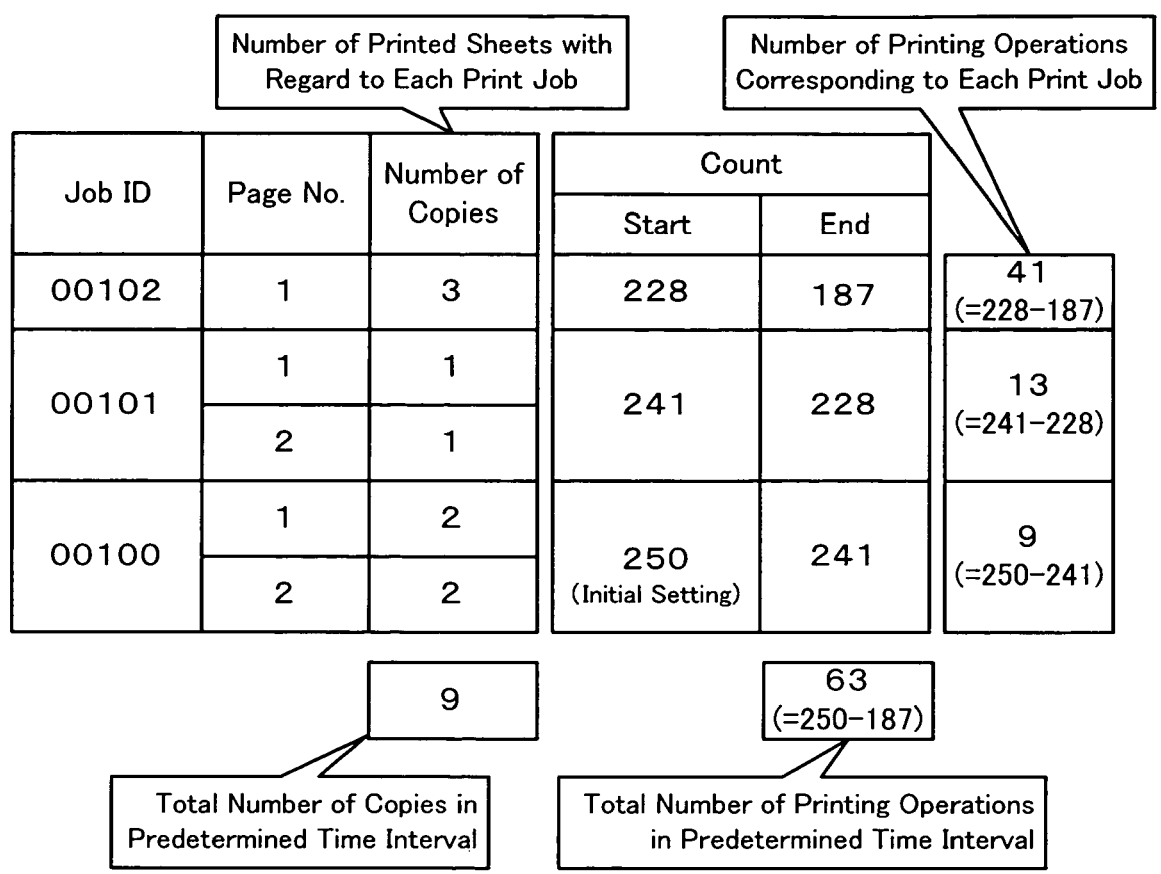
FIG. 16 shows one example of an abnormal state of the printer in the second embodiment.

FIGS. 14, 15, and 16 respectively show an example of the appropriate working status of the printer 40, an example of the unauthorized use state of the printer 40, and an example of the abnormal state of the printer 40 verified in the printer verification routine of FIG. 13. In any of these examples, the printer 40 has carried out three print jobs having job IDs '00100', '00101', and '00102' in a predetermined time interval, and the numbers of copies with regard to the respective print jobs are 4, 2, and 3. Namely the total number of copies within the predetermined time interval is 9. The allowable range is set to be 100% to 150% with regard to the ratio of the total number of printing operations to the total number of copies. The allowable range is also determined to be 100% to 150% with regard to the ratio of the number of printing operations corresponding to each print job to the number of copies with regard to the print job. The initial setting on the credit counter 44 is 250. In the state of FIG. 14, the count on the credit counter 44 is 240 in the current cycle of the printer verification routine. The total number of printing operations in the predetermined time interval is thus calculated as 250−240=10 (times). The ratio of the total number of printing operations to the total number of copies (9 pages) is approximately 110%, which is within the preset allowable range. The working status of the printer 40 is thus determined as appropriate. In the state of FIG. 15, on the other hand, the count on the credit counter 44 is 187 in the current cycle of the printer verification routine. The total number of printing operations in the predetermined time interval is thus calculated as 250−187=63 (times). The ratio of the total number of printing operations to the total number of copies (9 pages) is 700%, which is out of the preset allowable range. The verification process then calculates a ratio of the number of printing operations corresponding to each print job to the number of printed sheets with regard to the print job. The numbers of printing operations corresponding to the respective print jobs are 4 times, 2 times, and 3 times. The ratios are accordingly all equal to 100% and are within the predetermined allowable range. While the printer 40 normally works in response to the printing instructions, the ratio of the total number of printing operations to the total number of copies is out of the preset allowable range. The verification process thus assumes that the printer 40 is in the unauthorized use state. In the state of FIG. 16, on the other hand, the count on the credit counter 44 is 187 in the current cycle of the printer verification routine. The total number of printing operations in the predetermined time interval is thus calculated as 250−187=63 (times). The ratio of the total number of printing operations to the total number of copies (9 pages) is 700%, which is out of the preset allowable range. The verification process then calculates a ratio of the number of printing operations corresponding to each print job to the number of printed sheets with regard to the print job. The numbers of printing operations corresponding to the respective print jobs are 9 times, 13 times, and 41 times. The ratios are accordingly 225%, 650%, and 1025%, which are all out of the predetermined allowable range. The occurrence of some failure or trouble in the printer 40 may be the reason why the ratio of the total number of printing operations to the total number of copies is out of the preset allowable range. The verification process thus assumes that the printer 40 is in the abnormal state.

The CPU 21 of the print server 20 in the second embodiment corresponds to the printing instruction output module (see step S140 in the printing instruction output routine of FIG. 3), the operation number input module (see step S250 in the printing operation monitor routine of FIG. 4), and the assumption module (see the printer verification routine of FIG. 13) of the invention. The description of the operations of the photo studio system 10 in the second embodiment clarifies one example of the print system control method of the invention.

As described above, the photo studio system 10 of the second embodiment assumes the working status of the printer 40 or 50, based on the result of comparison between the total number of printed sheets with regard to printing instructions output to the printer 40 or 50 in a predetermined time interval and the actual number of printing operations by the printer 40 or 50 in the predetermined time interval, as well as the results of comparison between the number of printed sheets with regard to each print job and the number of printing operations corresponding to the print job. This arrangement accurately discriminates the abnormal state of the printer 40 or 50 from the unauthorized use state of the printer 40 or 50 in response to any foreign printing instruction received from a computer other than the print server 20.

Figure 17:
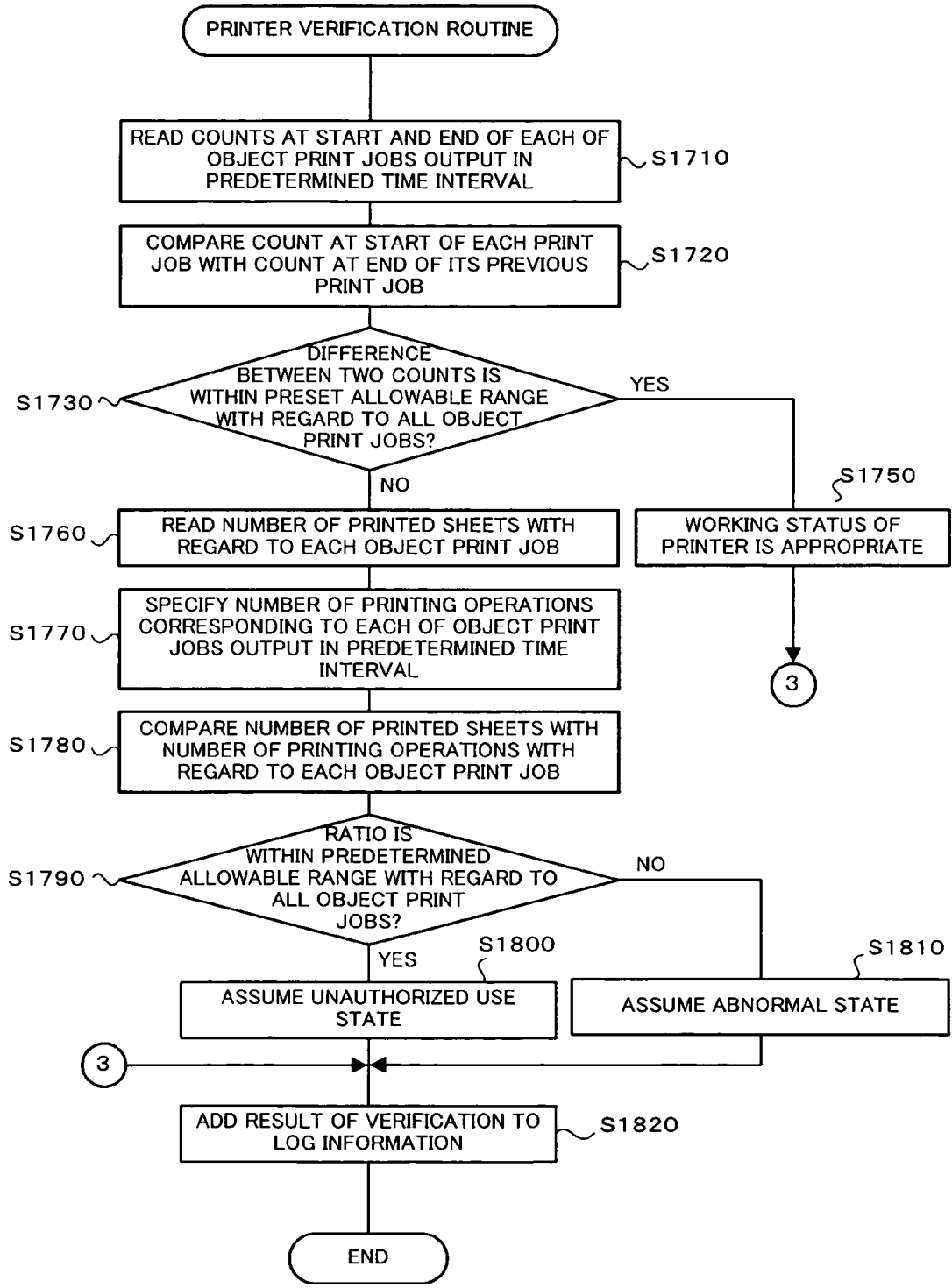
FIG. 17 is a flowchart showing a printer verification routine in one modified structure of the second embodiment.

One modification of the second embodiment executes a printer verification routine shown in the flowchart of FIG. 17, in place of the printer verification routine of FIG. 13. The credit counter 44 on the upper printer 40 decrements the count by one in response to each printing operation and is thus regarded as a counter to serially accumulate the number of printing operations. When the printer verification routine shown in the flowchart of FIG. 17 starts, the CPU 21 of the print server 20 first reads the counts on the credit counter 44 at the start and the end of each of object print jobs output to the printer 40 in a predetermined time interval between a previous cycle of log transmission and a current cycle (step S1710). The CPU 21 compares the count on the credit counter 44 at the start of each print job with the count on the credit counter 44 at the end of its previous print job to calculate a difference between the two counts (step S1720), and determines whether the calculated difference between the two counts is within a preset allowable range with regard to all the object print jobs (step S1730). In actual use, test printing may be performed between the end of a previous print job and the start of a current print job. The allowable range is thus set by taking into account such a potential for test printing. When the calculated difference between the two counts is within the preset allowable range with regard to all the object print jobs at step S1730, the CPU 21 determines that the current working status of the printer 40 is appropriate (step S1750) and adds the result of verification to the log information (step S1820). The printer verification routine is then terminated. When the calculated difference between the two counts is out of the preset allowable range with regard to any of the object print jobs at step S1730, on the other hand, the CPU 21 executes the processing of steps S1760 to S1820. The verification process compares the number of printed sheets with regard to each of the object print jobs with the number of printing operations corresponding to the object print job and assumes the state of printer 40 based on the results of comparison. The processing of steps S1760 to S1820 is identical with the processing of steps S1560 to S1620 in the printer verification routine of the second embodiment discussed above with the reference of the flowchart of FIG. 13 and is thus not specifically described here. At step S1820, the CPU 21 adds the result of verification of the printer 40, that is, the appropriate status or the inappropriate status, to the log information and in the case of the inappropriate status, also adds the result of assumption, that is, the unauthorized use state or the abnormal state, to the log information. The log information with the current working status of the printer added thereto is accordingly sent to the management server 70 at step S440 in the log transmission routine of FIG. 6. The above description with regard to the printer 40 is also applied to the printer 50.

Figure 18:
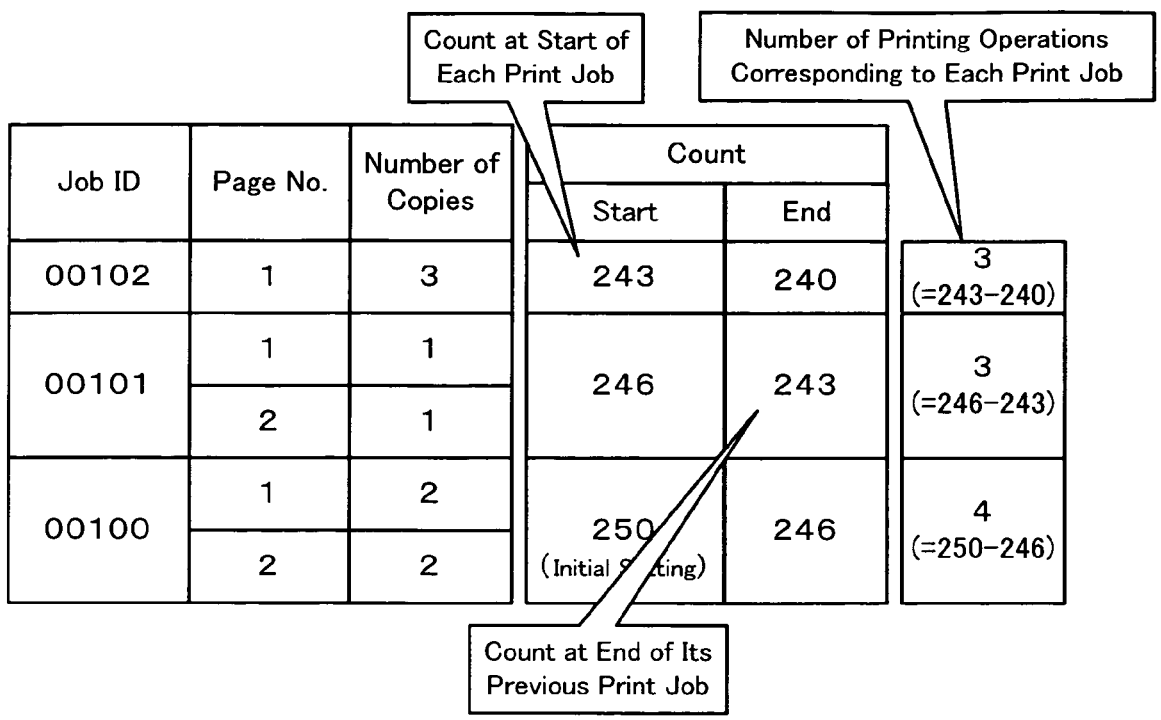
FIG. 18 shows one example of an appropriate working status of the printer in the modified structure of the second embodiment.

FIGS. 18, 19, and 20 respectively show an example of the appropriate working status of the printer 40, an example of the unauthorized use state of the printer 40, and an example of the abnormal state of the printer 40 verified in the printer verification routine of FIG. 17. In any of these examples, the printer 40 has carried out three print jobs having job IDs '00100', '00101', and '00102' in a predetermined time interval, and the numbers of copies with regard to the respective print jobs are 4, 2, and 3. The allowable range is set to be not less than 0 and not greater than 3 with regard to the difference between the count on the credit counter 44 at the start of each print job and the count on the credit counter 44 at the end of its previous print job. The allowable range is determined to be 100% to 150% with regard to the ratio of the number of printing operations corresponding to each print job to the number of copies with regard to the print job. In the state of FIG. 18, the count at the start of the print job having the job ID '00102' is 243, while the count at the end of its previous print job is 243. The count at the start of the print job having the job ID '00101' is 246, while the count at the end of its previous print job is 246. The respective differences between the two counts are both equal to 0 and are within the preset allowable range. The working status of the printer 40 is thus determined as appropriate. In the state of FIG. 19, the count at the start of the print job having the job ID '00102' is 190, while the count at the end of its previous print job is 218. The count at the start of the print job having the job ID '00101' is 220, while the count at the end of its previous print job is 246. The respective differences between the two counts are equal to 28 and 26, which are both out of the preset allowable range. The verification process then calculates a ratio of the number of printing operations corresponding to each print job to the number of printed sheets with regard to the print job. The numbers of printing operations corresponding to the respective print jobs are 4 times, 2 times, and 3 times. The ratios are accordingly equal to 100%, 100%, and 100%, which are all within the predetermined allowable range. While the printer 40 normally works in response to the printing instructions, the difference between the count on the credit counter 44 at the start of a print job and the count on the credit counter 44 at the end of its previous print job is out of the preset allowable range. The verification process thus assumes that the printer 40 is in the unauthorized use state. In the state of FIG. 20, the count at the start of the print job having the job ID '00102' is 202, while the count at the end of its previous print job is 212. The count at the start of the print job having the job ID '00101' is 230, while the count at the end of its previous print job is 241. The respective differences between the two counts are equal to 10 and 11, which are both out of the preset allowable range. The verification process then calculates a ratio of the number of printing operations corresponding to each print job to the number of printed sheets with regard to the print job. The numbers of printing operations corresponding to the respective print jobs are 9 times, 18 times, and 15 times. The ratios are accordingly equal to 225%, 900%, and 500%, which are all out of the predetermined allowable range. The occurrence of some failure or trouble in the printer 40 may be the reason why the difference between the count on the credit counter 44 at the start of a print job and the count on the credit counter 44 at the end of its previous print job is out of the preset allowable range. The verification process thus assumes that the printer 40 is in the abnormal state.

In the structure of the second embodiment discussed above, down counters are applied to the credit counters 44 and 54. The credit counters 44 and 54 may alternatively be up counters, which are incremented by one in response to each printing operation. In this modified structure, the count on the up counter is reset to zero at step S310 in the credit reset routine of FIG. 5, and the credit out flag is set to the ON state when the count on the up counter reaches a preset value (the initial setting in the second embodiment discussed above) at step S252 in the printing operation monitor routine of FIG. 4. Subtraction of the count on the down counter from the initial setting (the preset value) gives the actual number of printing operations in the structure of the first embodiment, while the count on the up counter directly shows the actual number of printing operations in this modified structure.

In the structure of the second embodiment, the print server 20 executes the printer verification routine. In one modified structure, the management server 70 may execute the print verification routine. The management server 70 receives the log information sent from the print server 20. The log information represents a record of print jobs and records of statuses of the printers 40 and 50 and accordingly includes information on the credit counters 44 and 54. The management server 70 can thus carry out the printer verification routine according to the same procedure as the processing flow by the print server 20. The operator of the management server 70 effectively verifies the working statuses of the printers 40 and 50 and accurately grasps the use records of the printers 40 and 50.

The above embodiment embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A print system that is capable of sending a status of a printer to a management server, which manages the status of said printer, via a telecommunication line, said print system comprising:

a counting module that counts up printing operations of said printer to give a count representing a number of printing operations;

a count judgment module that determines whether the count given by said counting module reaches a preset value;

a printing operation restriction module that restricts printing operations of said printer when said count judgment module determines that the count reaches the preset value;

a connection detection module that detects establishment of connection with said management server;

a count setting module that resets the count to a specified value prior to the preset value, in response to detection of establishment of connection with said management server by said connection detection module; and an auto connection trial module that tries to establish connection with said management server via the telecommunication line at every predetermined time interval after the start of said print system, wherein said count judgment module determines whether the count reaches the preset value, which is specified based on a maximum number of sheets printable with said printer in the predetermined time interval.

2. A print system that is capable of sending a status of a printer to a management server, which manages the status of said printer, via a telecommunication line, said print system comprising:

a counting module that counts up printing operations of said printer to give a count representing a number of printing operations;

a count judgment module that determines whether the count given by said counting module reaches a preset value;

a printing operation restriction module that restricts printing operations of said printer when said count judgment module determines that the count reaches the preset value;

a connection detection module that detects establishment of connection with said management server;

a count setting module that resets the count to a specified value prior to the preset value, in response to detection of establishment of connection with said management server by said connection detection module; and an auto connection trial module that tries to establish connection with said management server via the telecommunication line at every predetermined time interval after the start of said print system, wherein said count judgment module determines whether the count reaches the preset value, which is specified based on a maximum number of sheets printable in response to a user's requirements in the predetermined time interval.

3. A print system that is capable of sending a status of a printer to a management server, which manages the status of said printer, via a telecommunication line, said print system comprising:

a counting module that counts up printing operations of said printer to give a count representing a number of printing operations;

a count judgment module that determines whether the count given by said counting module reaches a preset value;

a printing operation restriction module that restricts printing operations of said printer when said count judgment module determines that the count reaches the preset value;

a connection detection module that detects establishment of connection with said management server;

a count setting module that resets the count to a specified value prior to the preset value, in response to detection of establishment of connection with said management server by said connection detection module;

an auto connection trial module that tries to establish connection with said management server via the telecommunication line at every predetermined time interval after the start of said print system; and a predetermined time interval variation module that varies the predetermined time interval according to a frequency of printing with said printer in response to a user's requirements.

4. A print system that is capable of sending a status of a printer to a management server, which manages the status of said printer, via a telecommunication line, said print system comprising:

a counting module that counts up printing operations of said printer to give a count representing a number of printing operations;

a count judgment module that determines whether the count given by said counting module reaches a preset value;

a printing operation restriction module that restricts printing operations of said printer when said count judgment module determines that the count reaches the preset value;

a connection detection module that detects establishment of connection with said management server;

a count setting module that resets the count to a specified value prior to the preset value, in response to detection of establishment of connection with said management server by said connection detection module;

a printing instruction output module that outputs printing instructions in time series to said printer;

an operation number input module that inputs a number of printing operations counted up by said counting module; and a verification module that compares a total number of printed sheets with regard to printing instructions output in a predetermined time interval to said printer by said printing instruction output module with a total number of printing operations input in the predetermined time interval by said operation number input module, and verifies a working status of said printer based on a result of the comparison.

5. A print system in accordance with claim 4, wherein said verification module determines whether either of a difference between the total number of printing operations input in the predetermined time interval by said operation number input module and the total number of printed sheets with regard to the printing instructions output in the predetermined time interval to said printer by said printing instruction output module and a ratio of the total number of printing operations to the total number of printed sheets is within a preset allowable range, so as to determine whether the working status of said printer is appropriate or inappropriate.

6. A print system in accordance with claim 4, said print system comprising said management server that manages the status of said printer, and a print server that sends the status of said printer to said management server via the telecommunication line, where said management server comprising at least said verification module and said print server comprising at least said printing instruction output module.

7. A print system that is capable of sending a status of a printer to a management server, which manages the status of said printer, via a telecommunication line, said print system comprising:
- a counting module that counts up printing operations of said printer to give a count representing a number of printing operations;
- a count judgment module that determines whether the count given by said counting module reaches a preset value;
- a printing operation restriction module that restricts printing operations of said printer when said count judgment module determines that the count reaches the preset value;
- a connection detection module that detects establishment of connection with said management server;
- a count setting module that resets the count to a specified value prior to the preset value, in response to detection of establishment of connection with said management server by said connection detection module;
- a printing instruction output module that outputs printing instructions in time series to said printer;
- a cumulative value input module that receives a cumulative count representing a number of printing operations at a start of execution of each printing instruction by said printer and a cumulative count representing a number of printing operations at an end of execution of the printing instruction by said printer, from said counting module; and
- a verification module that compares a cumulative count at an end of execution of a previous printing instruction received by said cumulative value input module with a cumulative count at a start of execution of a current printing instruction received by said cumulative value input module, among the printing instructions output in time series, and verifies a working status of said printer based on a result of the comparison.

8. A print system in accordance with claim 7, wherein said verification module determines whether either of a difference between the cumulative count at the start of execution of the current printing instruction and the cumulative count at the end of execution of the previous printing instruction among the printing instructions output in time series and a ratio of the cumulative count at the start of execution of the current printing instruction to the cumulative count at the end of execution of the previous printing instruction is within a preset allowable range, so as to determine whether the working status of said printer is appropriate or inappropriate.

9. A print system in accordance with claim 7, said print system comprising said management server that manages the status of said printer, and a print server that sends the status of said printer to said management server via the telecommunication line,
where said management server comprising at least said verification module and said print server comprising at least said printing instruction output module.

10. A print system that is capable of sending a status of a printer to a management server, which manages the status of said printer, via a telecommunication line, said print system comprising:
- a counting module that counts up printing operations of said printer to give a count representing a number of printing operations;
- a count judgment module that determines whether the count given by said counting module reaches a preset value;
- a printing operation restriction module that restricts printing operations of said printer when said count judgment module determines that the count reaches the preset value;
- a connection detection module that detects establishment of connection with said management server;
- a count setting module that resets the count to a specified value prior to the preset value, in response to detection of establishment of connection with said management server by said connection detection module;
- a printing instruction output module that outputs printing instructions in time series to said printer;
- a count input module that inputs a count representing a number of printing operations counted up in response to each of the printing instructions, from said counting module; and
- a verification module that compares a number of printed sheets with regard to each printing instruction with a count corresponding to the printing instruction, and verifies a working status of said printer based on a result of the comparison.

11. A print system in accordance with claim 10, wherein said verification module determines whether either of a difference between the count corresponding to each printing instruction and the number of printed sheets with regard to the printing instruction and a ratio of the count corresponding to each printing instruction to the number of printed sheets with regard to the printing instruction is within a preset allowable range, so as to determine whether the working status of said printer is appropriate or inappropriate.

12. A print system in accordance with claim 10, said print system comprising said management server that manages the status of said printer, and a print server that sends the status of said printer to said management server via the telecommunication line,
where said management server comprising at least said verification module and said print server comprising at least said printing instruction output module.

13. A print system that is capable of sending a status of a printer to a management server, which manages the status of said printer, via a telecommunication line, said print system comprising:
- a counting module that counts up printing operations of said printer to give a count representing a number of printing operations;
- a count judgment module that determines whether the count given by said counting module reaches a preset value;
- a printing operation restriction module that restricts printing operations of said printer when said count judgment module determines that the count reaches the preset value;
- a connection detection module that detects establishment of connection with said management server;
- a count setting module that resets the count to a specified value prior to the preset value, in response to detection of establishment of connection with said management server by said connection detection module;
- a printing instruction output module that exclusively outputs printing instructions in time series to said printer;
- an operation number input module that inputs a number of printing operations counted up by said counting module; and
- an assumption module that compares a total number of printed sheets with regard to printing instructions output in a predetermined time interval to said printer by said printing instruction output module with a total number of printing operations input in the predetermined time interval by said operation number input module, compares a number of printed sheets with regard to each of the printing instructions output to said printer by said printing instruction output module with a number of printing operations counted up in response to the each printing instruction and input by said operation number input module, and assumes a working status of said printer based on results of the comparisons.

14. A print system in accordance with claim 13, wherein said assumption module assumes that said printer carries out printing in response to a foreign printing instruction received from a foreign device other than said printing instruction output module, when the result of the comparison between the total number of printing operations input in the predetermined time interval and the total number of printed sheets with regard to the printing instructions output in the predetermined time interval to said printer is out of a preset allowable range but the result of the comparison between the number of printing operations counted up in response to each printing instruction and the number of printed sheets with regard to the each printing instruction is within a predetermined allowable range.

15. A print system in accordance with claim 13, wherein said assumption module assumes that said printer has some abnormality, when the result of the comparison between the total number of printing operations input in the predetermined time interval and the total number of printed sheets with regard to the printing instructions output in the predetermined time interval to said printer is out of a preset allowable range and the result of the comparison between the number of printing operations counted up in response to each printing instruction and the number of printed sheets with regard to the each printing instruction is out of a predetermined allowable range.

16. A print system in accordance with claim 13, said print system comprising said management server that manages the status of said printer, and a print server that sends the status of said printer to said management server via the telecommunication line,
where said management server comprising at least said assumption module and said print server comprising at least said printing instruction output module.

17. A print system that is capable of sending a status of a printer to a management server, which manages the status of said printer, via a telecommunication line, said print system comprising:
a counting module that counts up printing operations of said printer to give a count representing a number of printing operations;
a count judgment module that determines whether the count given by said counting module reaches a preset value;
a printing operation restriction module that restricts printing operations of said printer when said count judgment module determines that the count reaches the preset value;
a connection detection module that detects establishment of connection with said management server;
a count setting module that resets the count to a specified value prior to the preset value, in response to detection of establishment of connection with said management server by said connection detection module;
a printing instruction output module that exclusively outputs printing instructions in time series to said printer;
a cumulative value input module that receives a cumulative count representing a number of printing operations at a start of execution of each printing instruction by said printer and a cumulative count representing a number of printing operations at an end of execution of the printing instruction by said printer, from said counting module;
a printing operation number computation module that computes a number of printing operations corresponding to each printing instruction from the two cumulative counts received by said cumulative value input module; and
an assumption module that compares a cumulative count at an end of execution of a previous printing instruction received by said cumulative value input module with a cumulative count at a start of execution of a current printing instruction received by said cumulative value input module, among the printing instructions output in time series by said printing instruction output module, compares a number of printed sheets with regard to each of the printing instructions output to said printer by said printing instruction output module and a number of printing operations corresponding to the each printing instruction computed by said printing operation number computation module, and assumes a working status of said printer based on results of the comparisons.

18. A print system in accordance with claim 17, wherein said assumption module assumes that said printer carries out printing in response to a foreign printing instruction received from a foreign device other than said printing instruction output module, when a difference between the cumulative count at the start of execution of the current printing instruction and the cumulative count at the end of execution of the previous printing instruction, among the printing instructions output in time series, is out of a preset allowable range but the result of the comparison between the computed number of printing operations corresponding to each printing instruction and the number of printed sheets with regard to the each printing instruction is within a predetermined allowable range.

19. A print system in accordance with claim 17, wherein said assumption module assumes that said printer has some abnormality, when a difference between the cumulative count at the start of execution of the current printing instruction and the cumulative count at the end of execution of the previous printing instruction, among the printing instructions output in time series, is out of a preset allowable range and the result of the comparison between the number of printing operations corresponding to each printing instruction and the computed number of printed sheets with regard to the each printing instruction is out of a predetermined allowable range.

20. A print system in accordance with claim 17, said print system comprising said management server that manages the status of said printer, and a print server that sends the status of said printer to said management server via the telecommunication line,
where said management server comprising at least said assumption module and said print server comprising at least said printing instruction output module.

21. A print system control method of activating one or multiple computers to control a print system that is capable of sending a status of a printer to a management server, which manages the status of said printer, via a telecommunication line, said print system control method comprising the steps of:
counting up printing operations of said printer to give a count representing a number of printing operations;
judging whether the count given in said count-up step reaches a preset value;

restricting printing operations of said printer when said judgment step determines that the count reaches the preset value;

detecting establishment of connection with said management server;

resetting the count to a specified value prior to the preset value, in response to detection of establishment of connection with said management server in said detection step;

outputting printing instructions in time series to said printer; and comparing a total number of printed sheets with regard to printing instructions output in a predetermined time interval to said printer in said printing-instruction-output step with a total number of printing operations given in said count-up step in the predetermined time interval, and verifying a working status of said printer based on a result of the comparison.

22. A print system control method of activating one or multiple computers to control a print system that is capable of sending a status of a printer to a management server, which manages the status of said printer, via a telecommunication line, said print system control method comprising the steps of:

counting up printing operations of said printer to give a count representing a number of printing operations;

judging whether the count given in said count-up step reaches a preset value;

restricting printing operations of said printer when said judgment step determines that the count reaches the preset value;

detecting establishment of connection with said management server;

resetting the count to a specified value prior to the preset value, in response to detection of establishment of connection with said management server in said detection step;

outputting printing instructions in time series to said printer;

receiving a cumulative count representing a number of printing operations at a start of execution of each printing instruction by said printer and a cumulative count representing a number of printing operations at an end of execution of the printing instruction by said printer; and comparing a cumulative count at an end of execution of a previous printing instruction with a cumulative count at a start of execution of a current printing instruction, among the printing instructions output in time series, and verifying a working status of said printer based on a result of the comparison.

23. A print system control method of activating one or multiple computers to control a print system that is capable of sending a status of a printer to a management server, which manages the status of said printer, via a telecommunication line, said print system control method comprising the steps of:

counting up printing operations of said printer to give a count representing a number of printing operations;

judging whether the count given in said count-up step reaches a preset value;

restricting printing operations of said printer when said judgment step determines that the count reaches the preset value;

detecting establishment of connection with said management server;

resetting the count to a specified value prior to the preset value, in response to detection of establishment of connection with said management server in said detection step;

outputting printing instructions in time series to said printer;

inputting a count representing a number of printing operations given in said count-up step, in response to each of the printing instructions; and comparing a number of printed sheets with regard to each printing instruction with a count corresponding to the printing instruction, and verifying a working status of said printer based on a result of the comparison.

24. A print system control method of activating one or multiple computers to control a print system that is capable of sending a status of a printer to a management server, which manages the status of said printer, via a telecommunication line, said print system control method comprising the steps of:

counting up printing operations of said printer to give a count representing a number of printing operations;

judging whether the count given in said count-up step reaches a preset value;

restricting printing operations of said printer when said judgment step determines that the count reaches the preset value;

detecting establishment of connection with said management server;

resetting the count to a specified value prior to the preset value, in response to detection of establishment of connection with said management server in said detection step;

outputting printing instructions in time series to said printer; and comparing a total number of printed sheets with regard to printing instructions output in a predetermined time interval to said printer in said printing-instruction-output step with a total number of printing operations given in said count-up step in the predetermined time interval, comparing a number of printed sheets with regard to each of the printing instructions output to said printer in said printing-instruction-output step with a number of printing operations counted up in response to the each printing instruction and input in said count-up step, and assuming a working status of said printer based on results of the comparisons.

25. A print system control method of activating one or multiple computers to control a print system that is capable of sending a status of a printer to a management server, which manages the status of said printer, via a telecommunication line, said print system control method comprising the steps of:

counting up printing operations of said printer to give a count representing a number of printing operations;

judging whether the count given in said count-up step reaches a preset value;

restricting printing operations of said printer when said judgment step determines that the count reaches the preset value;

detecting establishment of connection with said management server;

resetting the count to a specified value prior to the preset value, in response to detection of establishment of connection with said management server in said detection step;

outputting printing instructions in time series to said printer;

receiving a cumulative count representing a number of printing operations at a start of execution of each printing instruction by said printer and a cumulative count representing a number of printing operations at an end of execution of the printing instruction by said printer;

computing a number of printing operations corresponding to each printing instruction from the two cumulative counts received in said cumulative-count-input step; and comparing a cumulative count at an end of execution of a previous printing instruction received in said cumulative-count-input step with a cumulative count at a start of execution of a current printing instruction received in said cumulative-count-input step, among the printing instructions output in time series in said printing-instruction-output step, comparing a number of printed sheets with regard to each of the printing instructions output to said printer in said printing-instruction-output step and a number of printing operations corresponding to the each printing instruction computed in said computation step, and verifying a working status of said printer based on results of the comparisons.

* * * * *